United States Patent
Agarwal et al.

(10) Patent No.: US 10,960,329 B2
(45) Date of Patent: Mar. 30, 2021

(54) SENSOR SYSTEM AND IMPLEMENTATION OF THE SAME

(71) Applicant: Battelle Energy Alliance, LLC, Idaho Falls, ID (US)

(72) Inventors: Vivek Agarwal, Idaho Falls, ID (US); John W. Buttles, Idaho Falls, ID (US); Ahmad Y Al Rashdan, Ammon, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 446 days.

(21) Appl. No.: 15/851,442

(22) Filed: Dec. 21, 2017

(65) Prior Publication Data

US 2019/0193005 A1 Jun. 27, 2019

(51) Int. Cl.
| | |
|---|---|
| *B01D 35/143* | (2006.01) |
| *F16K 37/00* | (2006.01) |
| *H01R 27/02* | (2006.01) |
| *G05B 19/042* | (2006.01) |
| *G05B 23/02* | (2006.01) |
| *H01H 36/00* | (2006.01) |

(52) U.S. Cl.
CPC ........ *B01D 35/143* (2013.01); *F16K 37/0033* (2013.01); *F16K 37/0041* (2013.01); *G05B 19/0423* (2013.01); *G05B 19/0426* (2013.01); *G05B 23/0221* (2013.01); *H01H 36/0046* (2013.01); *H01R 27/02* (2013.01)

(58) Field of Classification Search
CPC ............ G05B 19/0426; G05B 19/0423; G05B 23/0221; B01D 35/143; F16K 37/0033; F16K 37/0041; H01H 36/0046; H01R 27/02
See application file for complete search history.

(56) References Cited

U.S. PATENT DOCUMENTS

| | | | |
|---|---|---|---|
| 3,896,280 A | 7/1975 | Blake | |
| 6,936,160 B2* | 8/2005 | Moscaritolo | B01D 29/603 210/85 |
| 7,912,562 B2 | 3/2011 | Dute et al. | |
| 9,528,914 B2 | 12/2016 | Schumacher | |
| 2004/0059844 A1* | 3/2004 | Jones | G05B 19/0423 710/15 |
| 2006/0077917 A1 | 4/2006 | Brahmajosyula et al. | |
| 2010/0190369 A1* | 7/2010 | Byrne | H01R 4/185 439/215 |
| 2013/0298642 A1* | 11/2013 | Gillette, II | G01M 15/102 73/31.01 |
| 2015/0204457 A1 | 7/2015 | Jordan et al. | |
| 2017/0316683 A1* | 11/2017 | Pietrasik | G01D 18/008 |

OTHER PUBLICATIONS

Feng Xia, Wireless Sensor Technologies and Applications, Nov. 2009, Sensors, 9, pp. 8824-8830; doi:10.3390/s91108824, ISSN 1424-8220 (Year: 2009).*

* cited by examiner

*Primary Examiner* — Mischita L Henson
(74) *Attorney, Agent, or Firm* — TraskBritt

(57) ABSTRACT

Various embodiments described in the disclosure relate to wireless sensor systems. Some embodiments specifically relate to unitary modules for sensing, power, processing, communication, and data storage; and that may be connected by a common interface to form a wireless sensor system.

22 Claims, 17 Drawing Sheets

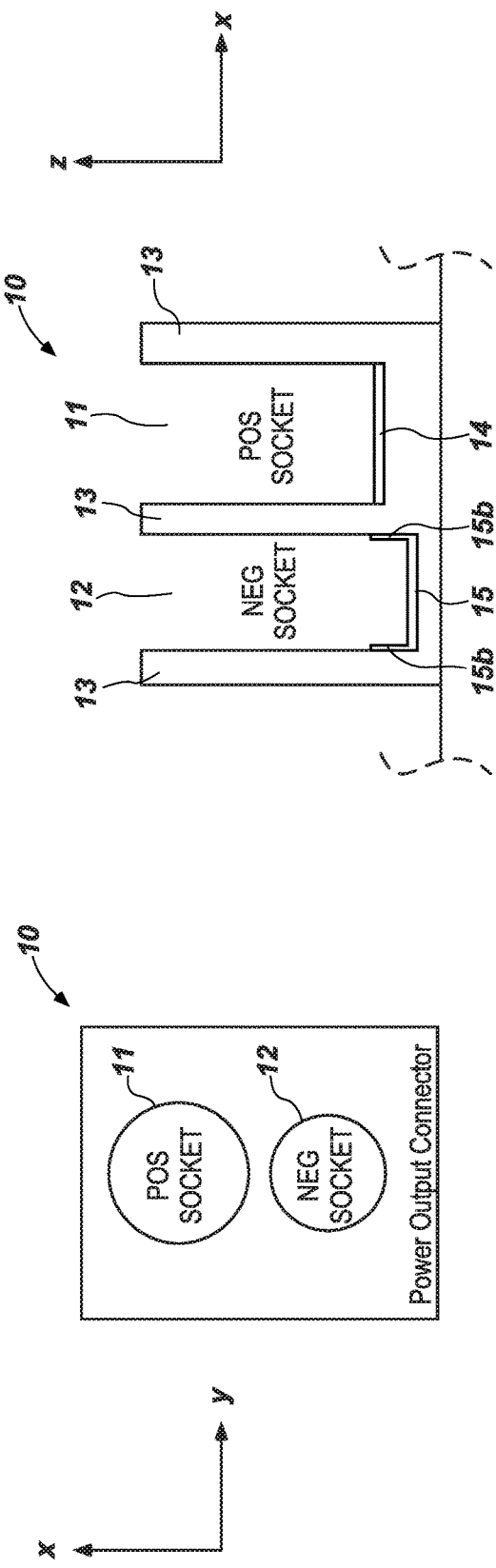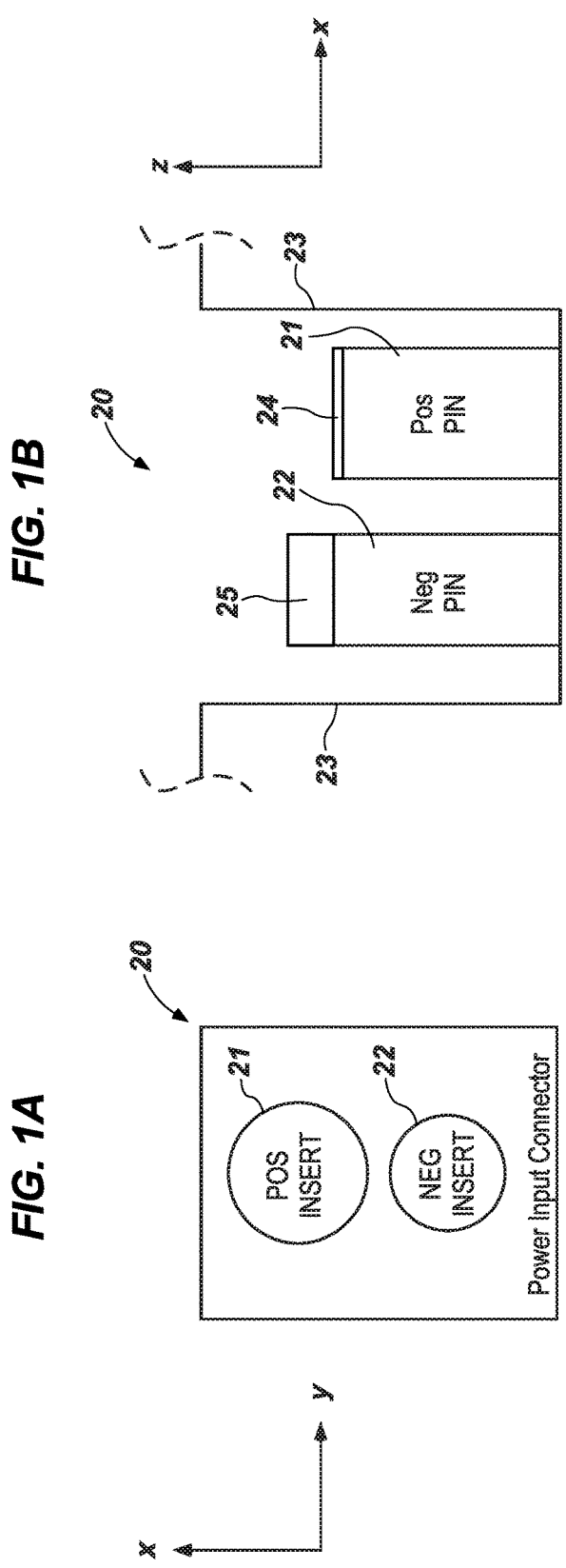

SENSOR SYSTEM AND IMPLEMENTATION OF THE SAME

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Various embodiments described in this disclosure relate to wireless sensor systems. Some embodiments relate specifically to unitary modules that may be connected by a common interface to form a wireless sensor system.

BACKGROUND

The current operating methods used in a Nuclear Power Plant (NPP) depend on a large number of technical, operational, and managerial staff. This is due to the large number of non-automated systems, sub-systems and components, all of which require extensive manual monitoring and manual operation. The surveillance of the position of manual valves is typically performed to confirm the operating position. Human surveillance sometimes requires that a technician physically travel to a manual valve, make a first surveillance to verify the position (open/close, partially open in throttling position, etc.), and communicate this information to a remote location. This may be followed by a second independent technician to verify the position to meet the nuclear quality and documentation requirements of the nuclear industry. This presents human error opportunities, nuclear safety challenges, regulatory compliance impacts, and personnel safety hazards. In an NPP there are thousands of manually operated valves that do not have a position indication device, requiring manual surveillance to verify their position.

Although the manual valve positions are currently verified using manual methods, the possibility of incorrect information, regulatory non-compliance and personnel safety risk is high.

Wireless sensor technology is sometimes used to communicate the position of valves to a remote location without endangering personnel or from a location where personnel cannot enter. Wireless sensor technology is deployed for instrumentation and control applications in many industries. The promise of lower installation cost, while achieving reliable monitoring of process parameters at many locations drives many existing instrument and measurement vendors to incorporate wireless sensor technology. Conventional wireless sensors typically consist of a proprietary sensor integrated in an instrument that is used together with other instruments from the same manufacture, using the same power supplies, same processor and communication technology, and same system software.

Conventional wireless valve position sensors are typically integrated in a valve or are added to a valve before qualification. Notably, if the position sensor needs to be replaced in such systems then the entire valve must be requalified. Even if conventional wireless position sensors are retrofitted on to a valve, it requires valve body disassembly and modification, in such cases the entire valve must be requalified and it is a time consuming and expensive process.

BRIEF SUMMARY

One or more embodiments of the present disclosure relate to a system, and more particularly, a sensor system. The sensor system may include unitary modules. The unitary modules may each be coupled to an interconnect, and the interconnect may include unwired connectors configured to facilitate transfer of data and power among the plurality of unitary modules. The plurality of unitary modules may be adapted to capture, store and communicate measurement data about a process or equipment.

Other embodiments of the present disclosure may be related to an interface. The interface may include a device input/output (I/O) socket, a first interface, and a second interface. The first interface may be coupled to the device I/O socket and include a number of groups of data inputs. The second interface may be coupled to the device I/O socket and include a number of groups of data outputs. The device I/O socket may be configured to send and receive data to a computing module. The computing module may be configured to associate each group of data inputs with one type of a number of types of computing modules, and associate each group of data output lines with one type of the number of types of computing modules.

Other embodiments of the present disclosure may relate to a measurement system. The measurement system may include a valve position measurement module, a processing and communication module, and an interconnect. The interconnect may include a plurality of unwired connectors configured to facilitate transfer of data and power to the valve position measurement module and processing and communication module.

BRIEF DESCRIPTION OF THE DRAWINGS

Purposes and advantages of the embodiments of the disclosure will be apparent to one of ordinary skill in the art from the detailed description in conjunction with the accompanying drawings, including:

FIG. 1A shows a top-down view of a power output connector, according to an embodiment of the disclosure;

FIG. 1B shows a cross-sectional view of a power output connector, according to an embodiment of the disclosure;

FIG. 2A shows a top-down view of a power input connector, according to an embodiment of the disclosure;

FIG. 2B shows a cross-sectional view of a power input connector, according to an embodiment of the disclosure;

DETAILED DESCRIPTION

Figure 3:
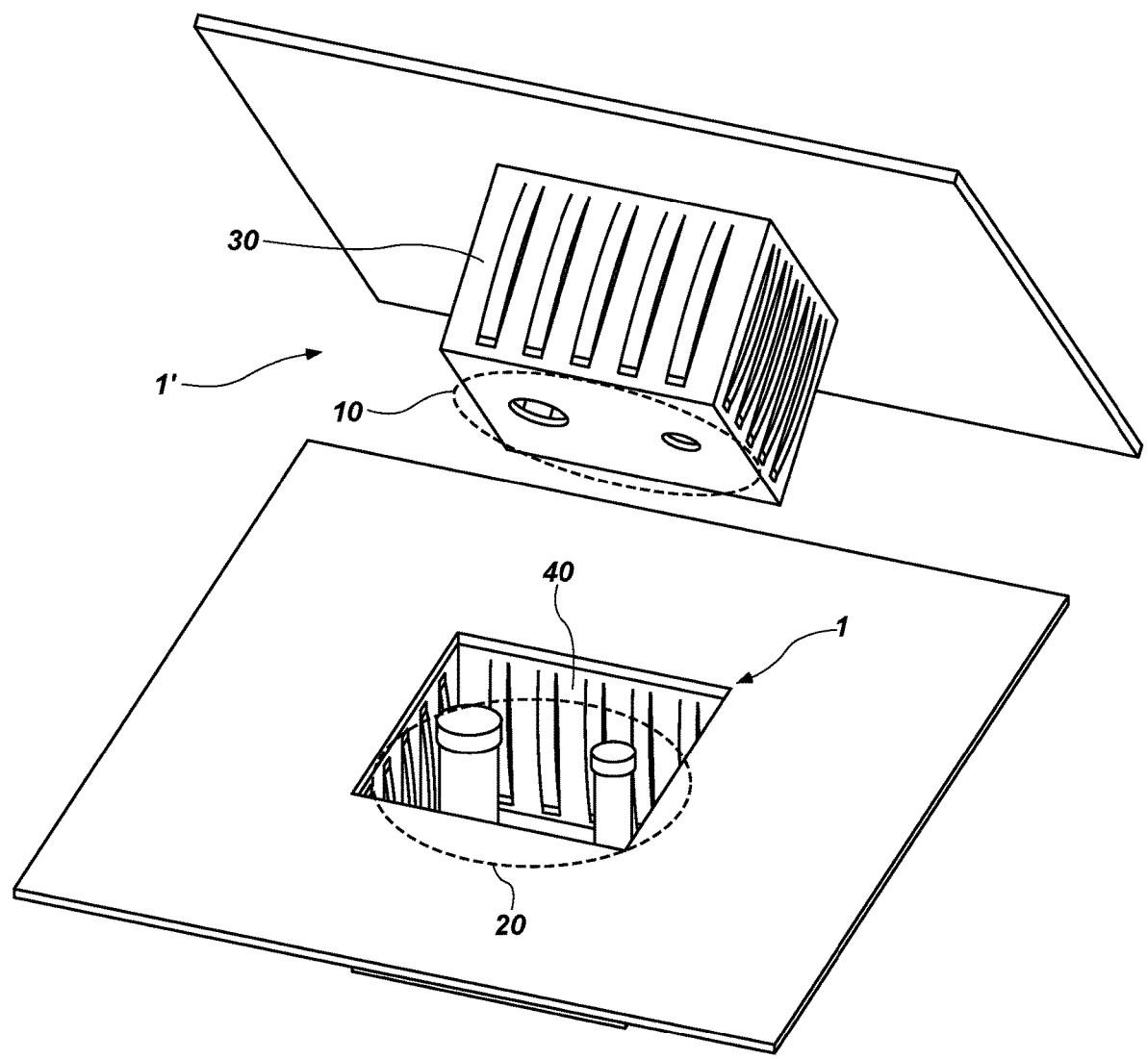
FIG. 3 shows a top and bottom view of unitary modules with a male data and a female data connector, according to an embodiment of the disclosure.

The following description provides specific details to provide a thorough description of various embodiments of the invention. However, one of ordinary skill in the art will understand that the disclosed embodiments may be practiced without using these specific details. Indeed, the disclosed embodiments may be practiced in conjunction with conventional systems and methods used in the industry. In addition, only those elements helpful to understand and enable one of ordinary skill in the art to practice the disclosed embodiments are described in detail. One of ordinary skill in the art will recognize that some elements are not described herein but, using various conventional method components and acts, would be in accord with the embodiments of this disclosure.

The following description may include examples to help enable one of ordinary skill in the art to practice the disclosed embodiments. The use of the terms "exemplary," "by example," and "for example," means that the related description is explanatory and though the scope of the disclosure is intended to encompass the recited examples and legal equivalents, the use of such terms is not intended to limit the scope of an embodiment or this disclosure to the specified components, steps, features, functions, arrangement of components, or the like. Moreover, the use of such terms does not indicate or imply that the related description comprises or is a preferred embodiment.

Any drawings accompanying this disclosure are for illustrative purposes only and are not drawn to scale. Elements common among figures may retain the same numerical designation; however, the similarity in numbering does not mean that the structures or components are necessarily identical in size, composition, configuration, or any other property.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

As noted, above, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are by way of example only and should not be construed as the only way to implement the present disclosure unless specified otherwise herein. Additionally, block definitions and partitioning of logic between various blocks are examples of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Many of the functional units described in this specification may be illustrated, described or labeled as logic, modules, engines, threads, or other segregations of programming code, to more particularly emphasize their implementation independence in accomplishing the features, functions, tasks or steps that are generally described herein. The various illustrative logical blocks, modules, and circuits described in connection with the embodiments disclosed herein may be at least partially implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

The functional units may be implemented using software or firmware, stored on a computer-readable storage medium, in system memory, or a combination thereof for execution by various types of processors.

In the case of a general-purpose computer, the logic and modules may be embodied in software classes and applications executed by processor cores, and while the modules are executing, the general-purpose computer may be thought of as a special-purpose computer or a specific-purpose computer. The logic and modules may also relate to specific purpose hardware, including the firmware and machine code, controlling its operation. An identified module of executable code may, for instance, comprise one or more physical or logical blocks of computer instructions, which may, for instance, be organized as a thread, object, procedure, or function. Nevertheless, the executable code of an identified module need not be physically located together, but may comprise disparate instructions stored in different locations which, when joined logically together, comprise the module and achieve the stated purpose for the module.

A module of executable code may comprise a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the software portions are stored on one or more physical devices, which are referred to herein as computer-readable media.

In some embodiments, the software portions are stored in a non-transitory state such that the software portions or representations thereof, persist in the same physical location for a period of time. Additionally, in some embodiments, the software portions are stored on one or more non-transitory storage mediums, which include hardware elements capable of storing non-transitory states and/or signals representative of the software portions, even though other portions of the non-transitory storage mediums may be capable of altering and/or transmitting the signals. Examples of non-transitory storage mediums are Flash memory and certain types of random-access memory (RAM). Another example of a non-transitory storage medium includes a read-only memory (ROM) that can store signals and/or states representative of the software portions for a period of time. However, the ability to store the signals and/or states is not diminished by further functionality of transmitting signals that are the same as, or representative of, the stored signals and/or states. For example, a processor may access the ROM to obtain signals that are representative of the stored signals and/or states to execute the corresponding software instructions.

A general-purpose processor (which may also be characterized herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer when the general-purpose computer is configured to execute computing instructions (e.g., software code) related to embodiments of the present disclosure.

The embodiments disclosed herein may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be rearranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Various embodiments described herein may include elements described as implemented in a "workstation," "computer," or a "computer system." Here, the terms "workstation," "computer," and "computer system" are to be understood to include at least one non-transitory computer-readable medium and at least one processing unit. In general, the storage medium will store, at one time or another, at least portions of an executable program code, and a processor(s) will execute one or more of the instructions included in that executable program code. It will be appreciated that the term "executable program code" and the term "software" mean substantially the same thing for the purposes of this description. It is not necessary to the practice of the various embodiments described herein that the storage medium and the processing unit be physically located in the same place. That is to say, it is foreseen that the processor and the memory might be distributed among physical pieces of equipment or even in geographically distinct locations. One of ordinary skill in the art will appreciate that "media," "medium," "storage medium," "computer-readable media," or "computer-readable medium" as used here, may include a diskette, a magnetic tape, a digital tape, a compact disc, an integrated circuit, a ROM, a CD, DVD, Blu-Ray, a cartridge, Flash memory, PROM, a RAM, a memory stick or card, or any other non-destructive storage medium usable by computers, including those that are re-writable.

Although the enabling software might be "written on" a disc, "embodied in" an integrated circuit, "carried over" a communications circuit, "stored in" a memory chip, or "loaded in" a cache memory, it will be appreciated that, for the purposes of this disclosure, the software will be referred to simply as being "in" or "on" a main memory that is a computer-readable medium. Thus, the terms "in" or "on" are intended to encompass the above-mentioned and all equivalent and possible ways in which software can be associated with a computer-readable medium.

Users may interact with the computer systems described herein by way of graphical user interfaces (GUIs) on a display and input devices such as touchscreens, keyboards, a computer mouse, touchpads, buttons, switches, jumpers, and the like. A GUI may include a console and/or dashboard and a user may interact with the GUI and, in turn, underlying software applications.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" about a given parameter, property, or condition means and includes, to a degree, that one of ordinary skill in the art would understand that the given parameter, property, or condition is met with a small degree of variance, such as, for example, within acceptable manufacturing tolerances. By way of example, depending on the parameter, property, or condition that is substantially met, the parameter, property, or condition may be at least 90% met, at least 95% met, or even at least 99% met.

The term "unitary," when used herein with "module" (e.g., "a unitary module" or "a unitary sensor module") means that a described module has within a single enclosure all the components, circuitry, and connections necessary to perform the module's described function(s). In one embodiment, an enclosure may be a hard plastic or metal case suitable to house computer, wireless signal, and electrical components.

Various embodiments described herein relate to a wireless sensor system that may be characterized as comprised of four classes of unitary modules, a sensor module, a processor and communication module, a data storage module, and a power module. These unitary modules may be interconnected by a common interface that is adapted to transfer power and data signals among the various modules without wires between the modules. In one embodiment, the modules may be housed in uniform enclosures that facilitate easy physical connection to each other by means of, for example, a snap connector or a threaded assembly to form a stack. The uniform enclosures may have about the same dimensions notwithstanding the fact that they may not house the same volume or type of components.

Individual modules may be upgraded or replaced without replacing other modules, thus, unlike conventional wireless sensors; faulty or obsolete functions may be replaced or upgraded without replacing the entire wireless sensor system.

Individual modules that have a common interface and a uniform enclosure may be added to a wireless sensor system. For example, an environmental sensor module may be added to a stack that already includes a valve position sensor module, a processor and communication module, a data storage module, and a power module configured or reconfigured to operate with the added environmental sensor. Once a wireless sensor system has been installed, the entire wireless system may not have to be replaced to add an environmental sensor module.

Each module may include a common interface with external and internal components that enable distribution of power and data signals among and between the modules, including communication between the processing module and other modules. Various embodiments of the common interface include data and power connectors that are described, below.

FIGS. 1A, 1B, 2A and 2B show an embodiments of a power output connector 10 (FIGS. 1A and 1B) that may be included with connector (1' (see FIG. 3), and a power input connector 20 (FIGS. 2A and 2B), that may be included with connector 1 (see FIG. 3). The connector 1' and connector 1 may, when coupled to each other and with other connectors, form an interconnect (also referred to herein as a "common interface"). The power output connector 10 may include positive socket 11 and negative socket 12, which, as shown in FIG. 1B, may be receptacles defined by output connector walls 13. The output connector walls 13 may define openings at a proximal end of the sockets 11 and 12, and the openings may be configured to receive power inserts, such as inserts 21 and 22 (FIGS. 2A and 2B). A positive output electrode 14 and a negative output electrode 15 may be disposed at the distal (or bottom) end of the sockets 11 and 12, respectively.

The power input connector 20 may include a positive insert 21 and a negative insert 22, which, as shown in FIG. 2B, may be positive and negative power pins. The positive insert 21 and negative insert 22 may be attached to, and extend from, a distal (or bottom) end of a receptacle defined by input connector walls 23, terminating in a free end. A positive input electrode 24 and negative input electrode 25 may be disposed at the free end of the positive insert 21 and negative insert 22, respectively.

The power output connector 10 and power input connector 20 may each be configured in terms of form to be complementary such that if coupled, they are interlocking, i.e., they engage with each other by overlapping or by the fitting together of projections and recesses.

In various embodiments, the sockets 11 and 12 and inserts 21 and 22 may be physically configured to facilitate interlocking at a correct polarity for power transfer. In one embodiment, the negative socket 12 has a smaller inside diameter than the positive socket 11 to facilitate the correct polarity for power transfer—i.e., to enable proper fit only if the insert polarity matches the socket polarity. In other embodiments, the inside diameter of the positive socket 11 may be smaller than the inside diameter of the negative socket 12.

In another embodiment, the receptacle of the negative socket 12 is longer (i.e., deeper) than the receptacle of the positive socket 11 to prevent the positive input electrode 24 from contacting the positive output electrode 14 before the negative input electrode 25 contacts the negative output electrode 15. The negative output electrode 15 may include a sleeve portion 15b that is disposed along an inner surface of the output connector wall 13, and adapted to contact the sides of the negative input electrode 25 while the negative insert 22 is inserted into the negative socket 12 (i.e., before the positive insert 21 is fully inserted into the positive socket 11).

In a further embodiment, the positive socket 11 and positive insert 21 and the negative socket 12 and negative insert 22 may have respectively differently shaped cross-sections so that a socket will only be able to receive the proper insert.

While the sockets and inserts in the embodiments described above are shaped like circular cylinders, they may have other shapes, such as flattened, cubic, elliptical cylinder, multi-sided prism (e.g., an octagonal prism), and the like. In addition, the connector shape and configuration may conform, in whole or in part, to a variety of IEEE (Institute of Electrical and Electronics Engineers—Standards Association) and UL (Underwriters Laboratories) standards. Notably, in the embodiment described above there is no ground pin, however, it is specifically contemplated that a ground pin may be included (e.g., if a power module is connected to an electrical system).

FIG. 3 shows a male data connector 30 of the connector 1', and a female data connector 40 of the connector 1. Also shown is the power output connector 10 and the power input connector 20. The connector 1 and connector 1' have a female and male configuration, respectively. One of ordinary skill in the art would understand that is a design consideration and the connector 1 and connector 1' may have a male and female configuration, respectively.

Figure 4A:
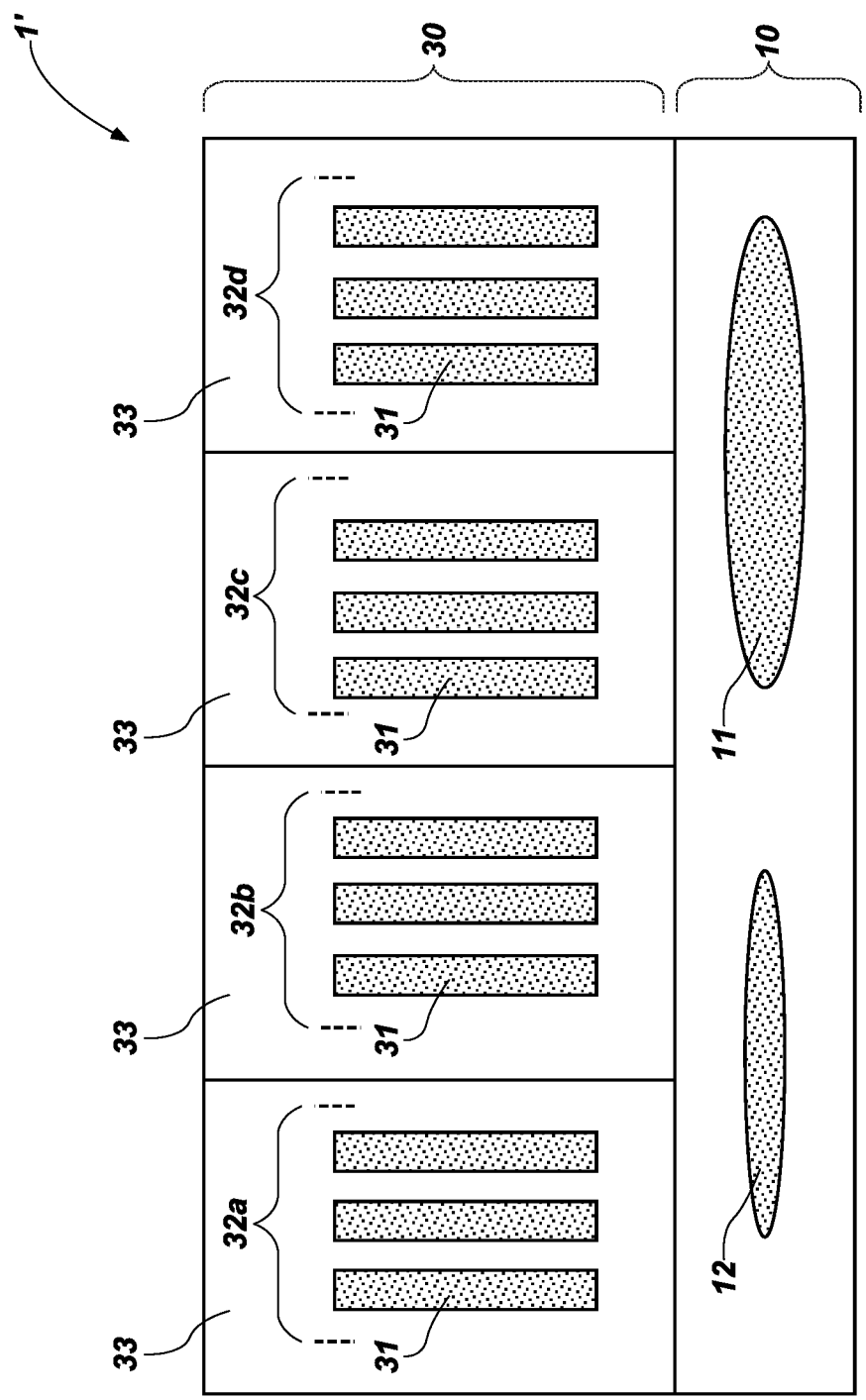
FIG. 4A shows a flattened view of the male data connector, according to an embodiment of the disclosure.

The male data connector 30 may include one or more data tabs 31 (FIG. 4A). As illustrated in FIG. 4A, the data tabs 31 may be arranged in groups 32. In this embodiment, there are groups 32a-32d—one group of data tabs 31 for each module 33 in a four-module wireless sensor system. In this embodiment, the data tabs 31 are arranged on the male data output connector walls 13 (FIG. 1B), which also correspond to the input connector walls 23 (FIG. 2B).

Figure 4B:
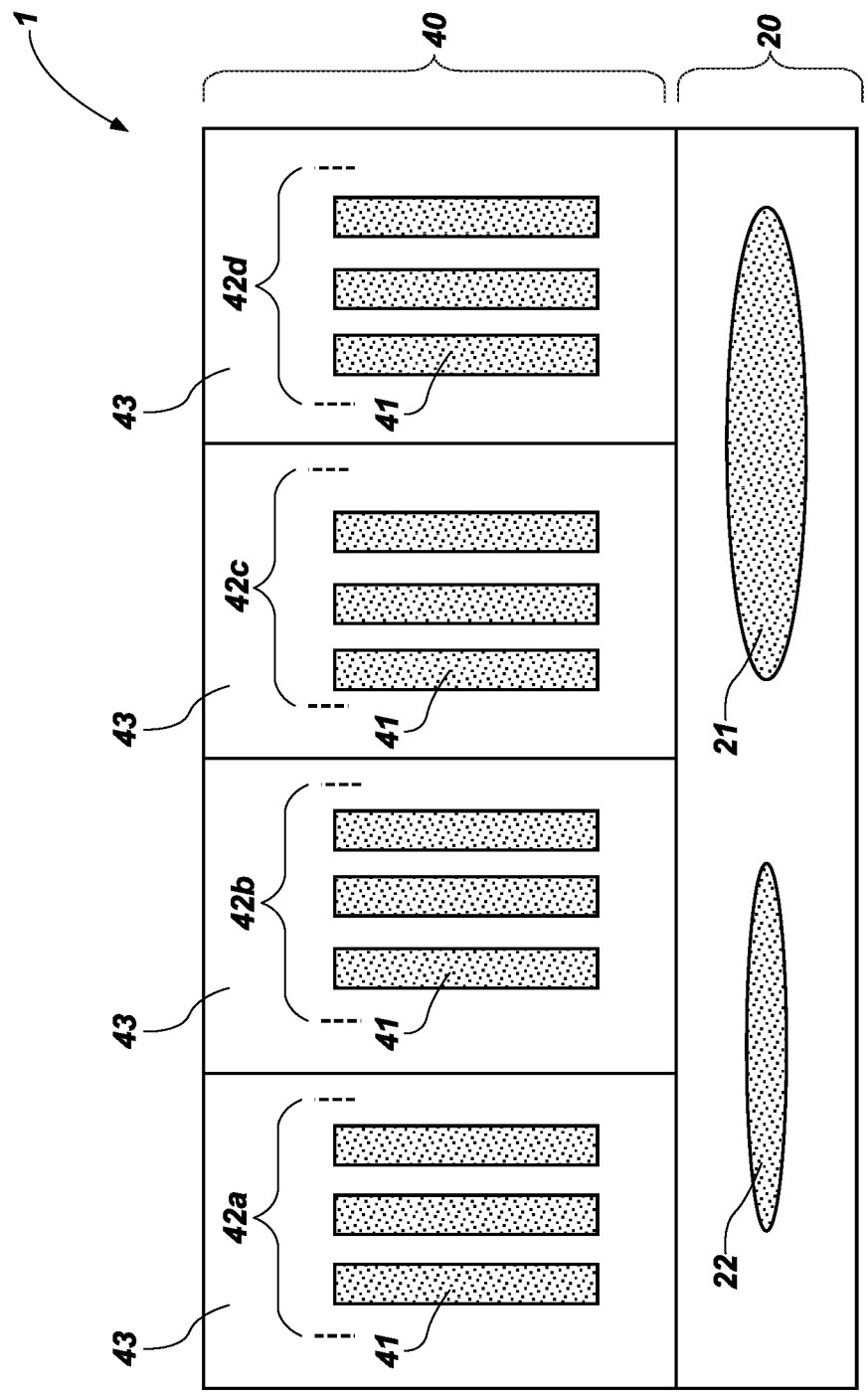
FIG. 4B shows a flattened view of the female data connector, according to an embodiment of the disclosure.

Referring to FIG. 4B, the female data connector 40 may also include one or more data tabs 41. The data tabs 41 may be arranged in groups 42. In this embodiment, there are groups 42a-42d—one group of data tabs 41 for each type of module 43 in a four-type module wireless system. In this embodiment, the data tabs 41 are arranged on the female data input connector walls 23 (FIG. 2B), which also correspond to the output connector walls 13 (FIG. 1B).

FIG. 4A shows a flattened view of the male data connector 30 of connector 1' as shown in FIG. 3. FIG. 4A depicts data tabs 31 arranged in groups 32a-32d. In this embodiment, each group corresponds to a module in a four-module wireless sensor system. FIG. 4B shows a flattened view of the female data connector 40 of connector 1 as shown in FIG. 3. FIG. 4B depicts data tabs 41 arranged in groups 42a-42d. In this embodiment, each group corresponds to a module in a four-module wireless sensor system. The same group-type assignments are made for the groups 32a-32d and 42a-42d such that, when the male data connector 30 and female data connector 40 are coupled, data tabs of the same type are in contact, and are communicatively coupled (i.e., data may transfer across the contact).

In the embodiment illustrated in FIGS. 3, 4A and 4B, data tabs 31 and data tabs 41 may be assigned to a module type that may be physically arranged together. Using the example of a rectangular-shaped connector, a first side has data tabs to exchange data from a power module, a second side has data tabs to exchange data from a data storage module, a third side has data tabs to exchange data from a processor and communication module, and a fourth and last side has data tabs to exchange data from the sensor module. In another embodiment, the module type may correspond to the position of a data tab 31 within a group 32—e.g., a first data tab is assigned to exchange data storage data, a second data tab is assigned to exchange power data, a third data tab is assigned to exchange sensor data, and a fourth data tab is assigned to processor and communication data.

In various embodiments, additional data tab types may be added or removed depending on the specific designed needs. For example, it is specifically contemplated that data tabs may be added for control of specific data exchange, for example, control of equipment in an industrial control system related to a process under control.

As with other embodiments, the male data connector 30 and female data connector 40 may include physical features to enable proper alignment of power and data if connectors 30 and 40 are connected. In one embodiment, the male data connector 30 and female data connector 40 are complementary. In various embodiments, the data tabs 31 and 41 may be metal contacts selected to have sufficient connectivity to facilitate data packet level exchange across the contact surfaces.

Figure 5:
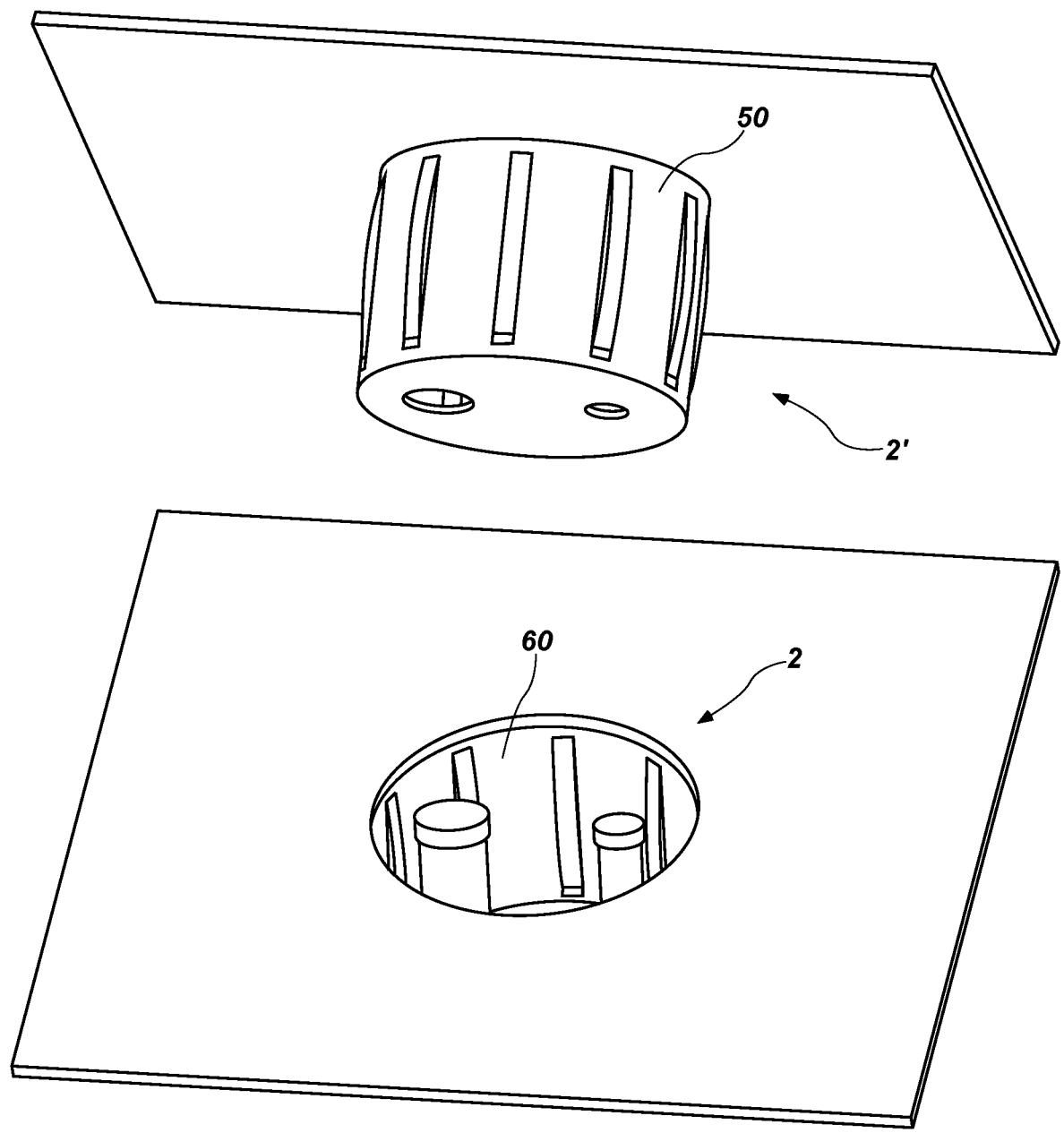
FIG. 5 shows a top view and a bottom view of unitary modules with a male data connector and a female data connector, according to an embodiment of the disclosure.

FIG. 5 shows an embodiment of connector 2 and connector 2', each having a round shape. As shown in FIG. 5, a male data connector 50 and a female data connector 60 are arranged on curved walls instead of walls of a cube as depicted in FIG. 3. In one embodiment, the data tabs may be equally spaced along the connector circumference and may be logically partitioned/grouped to support module-dependent communication.

Figure 6:
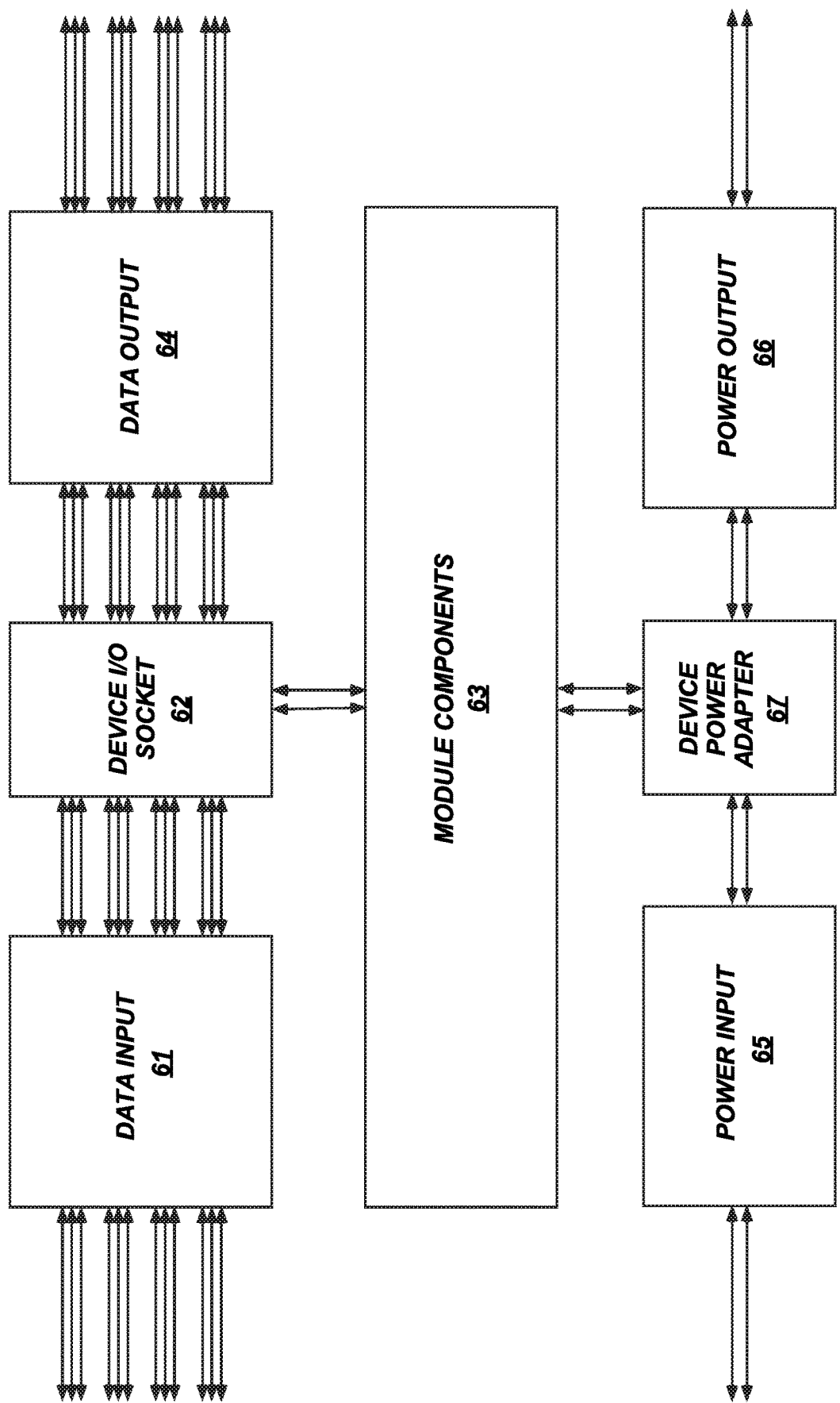
FIG. 6 shows a system level block diagram of an embodiment of a connector coupled to a module, according to an embodiment of the disclosure.

FIG. 6 shows a system level block diagram of an embodiment of the connector 1 coupled to a module, according to an embodiment of the disclosure. A data input 61 may be communicatively coupled to a device I/O socket 62. In one embodiment, the data input 61 may be the female data connector 40. The device I/O socket 62 may be configured to facilitate packet level data transfer to and from communication equipment at the module components 63, the data input 61, and a data output 64. In one embodiment, the data output 64 may be a male data connector 30.

A power input 65 and power output 66 may be electrically coupled to a device power adapter 67. The device power adapter 67 may be configured to provide power to one or more of the module components 63, data input 61, device I/O socket 62, and data output 64. The device power adapter 67 may also be configured to facilitate power transfer to other modules via the power output 66. In one embodiment, the power input 65 may be a power input connector 20, and the power output 66 may be a power output connector 10.

Figure 7A:
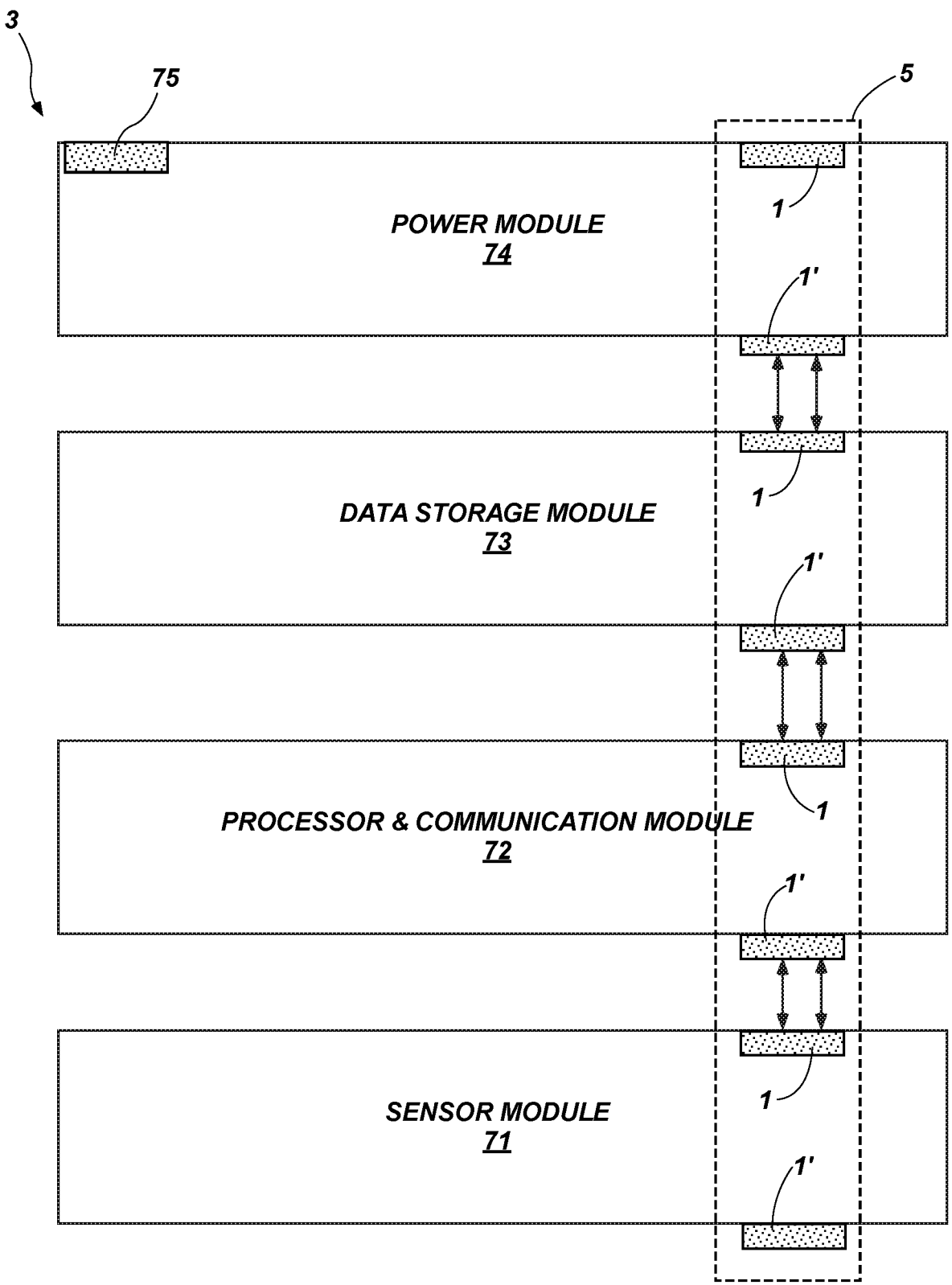
FIG. 7A shows a wireless sensor system, according to an embodiment of the disclosure.

FIG. 7A shows a wireless sensor system 3, in accordance with an embodiment of the disclosure. The wireless sensor system 3 may include a sensor module 71, processor and communication module 72, a data storage module 73 and a power module 74. In one embodiment, the modules of the wireless sensor system 3 may be coupled via an interconnect 5 that includes one or more connectors 1 and connectors 1' of each module. It is specifically contemplated that other embodiments of the wireless sensor system may include modules of a different type, functionality, and technology.

Figure 8:
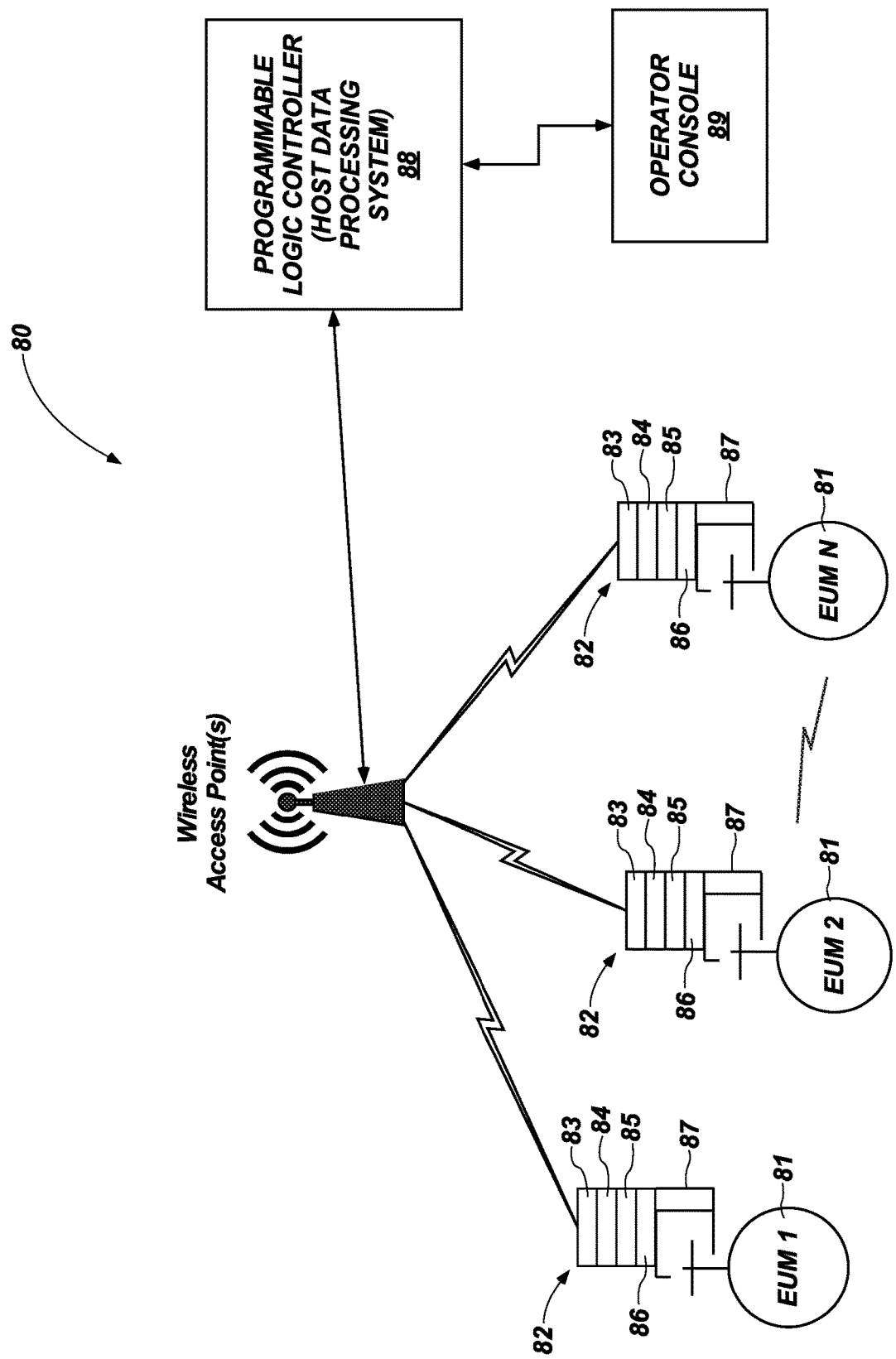
FIG. 8 shows a valve position sensor system implemented in a measurement system, according to an embodiment of the disclosure.

In this embodiment, the power module 74 is the top of the stack and the connector 1 is exposed. Similarly, the sensor module 71 is at the bottom of the stack and the connector 1' is exposed. In one embodiment, a cover may be placed over the exposed connectors 1 and 1'. In another embodiment, the wireless sensor system 3 may be housed within a single enclosure that protects the connector 1 of the power module 74 and connector 1' of the sensor module 71. A cover and/or housing protects the otherwise exposed connectors from debris, unauthorized access, etc. In one embodiment, the power module 74 and sensor module 71 may be programmed to be at the ends of the stack/end of the interconnect 5. A module programmed to be an "end-of-line" module may do one or more of the following: deactivate its exposed connectors, generate a visual or audible alarm if a cover is removed from an exposed connector, and generate an alarm message that is sent to the processor and communication module 72 and an operator console 89 (FIG. 8).

Sensor module 71 may include the connections for multiple sensors, multiple types of sensors, and multiple sensor manufacturers (e.g., temperature, pressure, flow, position, etc.). The sensor module 71 may include a microprocessor configured to provide signal conditioning and store calibration data. In this manner, the sensor module 71 may perform edge processing of sensor data collected by the various sensors included in the module. The sensor module 71 may include a sensor microprocessor to manage data collection, control sensor power requirements and communicate with the processor and communication module 72. For example, the sensor module 71 may be configured to send sensor data, status information and receive setup and diagnostic commands as required, to and from the processor and communication module 72. The wireless sensor system 3 may include multiple sensor modules 71, for example, by connecting another sensor module 71 to the system by way of an interconnect 5.

Processor and communication module 72 may be configured to perform most or all communications to and from the sensor module(s) 71, data storage module 73 and power module(s) 74. In one embodiment, the processor and communication module 72 may include a radio or other wireless antenna adapted to send, e.g., sensor data, to a host sensor data processing system (not shown). Such a radio may employ, or include antennas for, one or more of several different wireless technology standards (e.g., WiFi, Bluetooth Low Energy (BLE), Near-field Communication (NFC), ZIGBEE® (IEEE 801.15.4), 6LoWPAN, Leaky Feeder (operating at 900 MHz, cellular, etc.). In another embodiment, several different radios may be incorporated to use a combination of different, or same, wireless technologies. In other embodiments, the processor and communication module 72 may include equipment for wired communication (alternatively or in addition to, the wireless communication); for example, equipment for ETHERNET® (IEEE 802.3xx), Universal Serial Bus (release 1, 2 or 3), FIREWIRE® (IEEE 1394), etc. The processor and communication module 72 may include a microprocessor configured to manage sensor data, provide a web interface to the wireless sensor system 3 and implement security for data transmission. One of ordinary skill in the art will understand that as new communication methods are developed the processor and communication module 72 may be replaced to take advantage of new technology. In one embodiment, transmission and reception of data packets may be indicated by light-emitting diodes (LEDs) mounted on the side of the processor and communication module 72. In one embodiment, these LEDs may be configured to only illuminate while in a maintenance/setup mode to assist maintenance personal—so during normal operation, they would be configured to be off to conserve power.

Data storage module 73 may be configured to receive sensor data from the processor and communication module 72, and store sensor data. The stored sensor data may be transmitted later, or, if communication is lost, the data may be stored for future retrieval. In one embodiment, the sensor data may be accessed and retrieved using the processor and communication module 72. In another embodiment, a data storage module 73 may be replaced with another data storage module 73, and the sensor data accessed by an auxiliary port or by removing the storage media of the old data storage module 73. In yet another embodiment, the sensor data may be downloaded using a maintenance/setup communication port on a power module 74.

Power module 74 may be configured to supply power to the processor and communication module 72, data storage module 73 and sensor module(s) 71. In one embodiment, the power source may be one or more of batteries, solar cells, vibration, thermal, radio frequency, a combination of these sources, or other forms of energy harvesting/storage not yet developed, including in a hybrid arrangement.

The power module 74 may include an auxiliary port 75 that facilitates maintenance personal to power the wireless sensor system 3 from an external power source as to not drain the power module. One or more of energy production, storage, regulation, measurement of power used and remaining, and all other necessary power functions are managed by the power module 74 may be performed by a microprocessor in the power module 74. The microprocessor may also be configured to control communication with the processor and communication module 72 to send status information or receive setup and diagnostic commands as required. The wireless sensor system 3 may include more than one power module 74 by connecting another power module 74 via an interconnect 5.

In one embodiment, the power module 74 may be configured to provide maintenance personal access to perform initial setup of the wireless sensor system 3, execute software upgrades and perform reconfiguration and diagnostics as required using the auxiliary port 75. In one embodiment, the amount of power available from the power module 74 may be indicated by LEDs mounted on a side of the power module 74. These LEDs may be configured to be illuminated if in a maintenance/setup mode to assist maintenance personal. During normal operation, the LEDs may be configured to be off to conserve power.

In one embodiment, the wireless sensor system 3 may be a stack. The stack may be enclosed in a housing that protects the individual modules from harsh environments. Universal or custom mounting bracket on outside of enclosure may be used to attach the stack to equipment or a space to be measured (e.g., temperature or flow in a piece of pipe). The enclosures for each module in the wireless sensor system 3 may have a uniform dimensions (e.g., form factor) and the connectors 1 may be disposed on the top and bottom of each module such that, when stacked, complementary connectors (e.g., power input connector 20—power output connector 10, male data connector 30—female data connector 40) are aligned to interlock and form electrical and communicative connections.

Figure 7B:
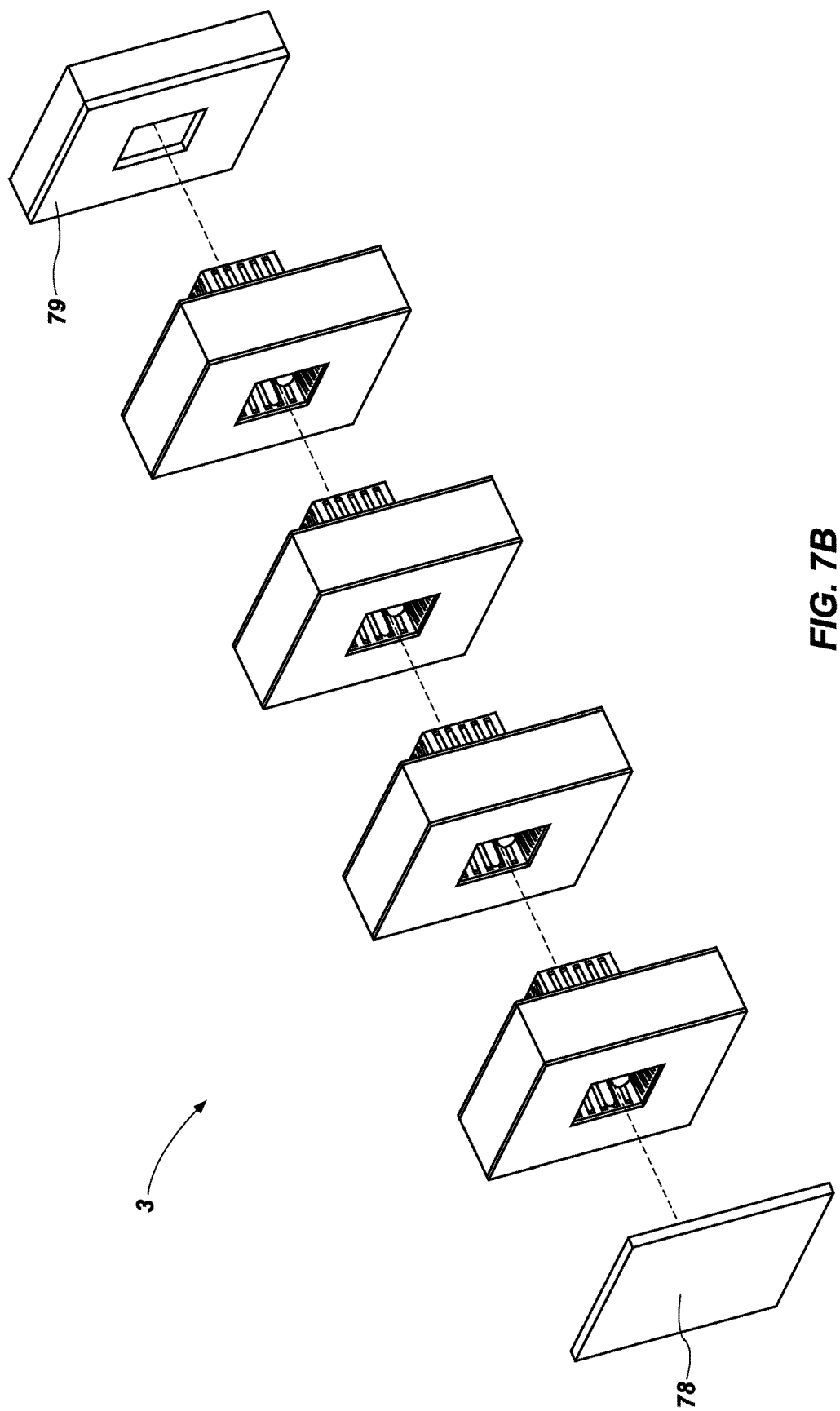
FIG. 7B shows an exploded view of the wireless sensor system, according to an embodiment of the disclosure.

FIG. 7B is an exploded view of the wireless sensor system 3, in accordance with an embodiment of the disclosure. FIG. 7B shows an embodiment of a female connector cap 78 and a male connector cap 79.

As noted, embodiments of a wireless sensor system 3 may be used in a variety of applications. For example, a wireless sensor system 3 may be a better, more easily and inexpensively implemented and maintained solution than conventional wireless sensors for measuring and monitoring valve positions. Conventional valve position sensor instruments are an integral part of the valve or must be added to the valve before qualification. If a sensor needs to be replaced then the entire valve must be requalified, which may be a costly and a time-consuming process. Embodiments of the wireless sensor system 3, and the sensor module 71, or any other module described herein, may be replaced/upgraded without requalifying the valve, saving cost and time.

FIG. 8 shows a valve position sensor system 82 implemented in a wireless measurement system 80, in accordance with an embodiment of the disclosure. The wireless measurement system 80, for example, may monitor and report the position of valves in a nuclear power plant, oil and gas facility, chemical processing facility, biotech or pharma production facility, or other facility or processing system where a valve position may need to be monitored. While this embodiment of the wireless measurement system 80 is described with reference to a valve position sensor system 82, the wireless measurement system 80 may include, additionally or alternatively, a pressure sensor system, a temperature sensor system, a flow sensor system, and combinations thereof.

The wireless measurement system 80 may include one or more valve position sensor systems 82 configured to monitor one or more equipments 81. In one embodiment, the valve position sensor system 82 may include one or more unitary modules, here, a power module 83, a data storage module 84, a processor and communication module 85, and a valve position measurement module 86. The valve position sensor systems 82 may also include a valve position measurement frame 87. The modules 83, 84, 85, and 86 are positioned on (e.g., resting on or adhered to) the valve position measurement frame 87, and are arranged in a wireless sensor system stack (as illustrated in FIGS. 7A and 7B).

The valve position measurement module 86 may be a sensor module 71 (see FIG. 7A) configured to receive position information about a valve handle. The valve position measurement module 86 may be coupled to a valve position sensor (not shown), for example, a magnetically activated resistor sensor that changes resistive value based on a position of a magnet attached to a valve handle. One advantage of a magnetically activated resistor sensor is that it requires little to no electrical power to measure a valve position and a position may be measured continually throughout a full range of movement of a valve. Conventional valve position sensors typically require electrical power to make a measurement (e.g., shaft encoders, linear variable differential transformer (LVDT), revolution counting, etc.), or use limit switches to obtain intermediate position measurements.

The communication module 85 may be a processor and communication module 72 (see FIG. 7A) and may be configured to manage the communication from the valve position measurement module 86 to host data processing system 88. The communication module 85 may include a processor that incorporates built-in encryption and a radio to transmit valve position measurement data to a host data processing system 88 by way of an access point of a wireless network. In various embodiments, the valve position measurement data at the host data processing system 88 may be accessible by an operator console 89. The operator console 89 may have applications running thereon that provide dashboard data and administrative tools for monitoring, configuring, and setting up the wireless measurement system 80, generally, and the valve position sensor system 82.

Such a radio may employ one of several different wireless technology standards (e.g., WiFi, BLE, LoWPAN, ZIGBEE® (IEEE 802.15.4), Leaky feeder, LTE, etc.). In another embodiment, several different radios would be in the communication module using a combination of different, or same, wireless technologies. As new encryption and/or communication methods are developed this module may be replaced to take advantage of new technology. Conventional valve position measurement systems typically use either a proprietary communication system or a single standard. It is difficult to change the communication technology they use.

The valve position measurement frame 87 may be an attachment device adapted to facilitate positioning the valve position sensor system 82 and sensor elements relative to a valve. Various embodiments of the valve position measurement frame 87 may be adapted to attach to different types of manual valves, for example, rising stem, rising handle and quarter-turn.

Embodiments of the valve position measurement frame 87 may incorporate features adapted to adjust the width, length, and height of the valve position measurement frame 87 and its relative position on a valve so the valve position measurement module 86 may be positioned to facilitate measurement of the valve position. In this way, for example, a valve position measurement frame 87 adapted to attach to a rising stem valve may attach to different sizes of rising stem valves from different manufacturers. For conventional frame modules, each valve manufacturer still typically uses a custom positioning frame that is individually made for each valve size with little permitted variation, which is not useful for other valves and thus not "universal." Embodiments of the valve position measurement frame 87 overcome this disadvantage of conventional frame modules.

FIGS. 9A, 9B, 9C, 9D, 10A, and 10B illustrate embodiments of three classes of attachment devices of the valve position measurement frame 87. The attachment devices shown were manufactured using three-dimensional (3D) printing, but one of ordinary skill in the art would understand that other manufacturing methods may be used.

Figure 9B:
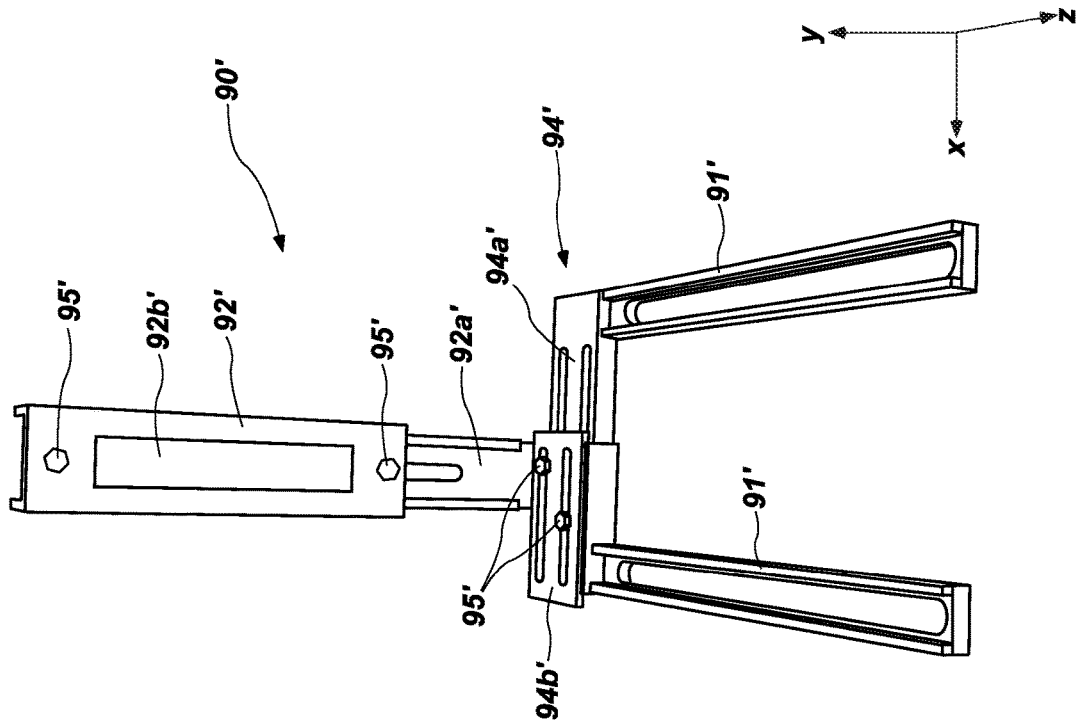
FIG. 9B shows a rising handle attachment, according to another embodiment of the disclosure.
Figure 9A:
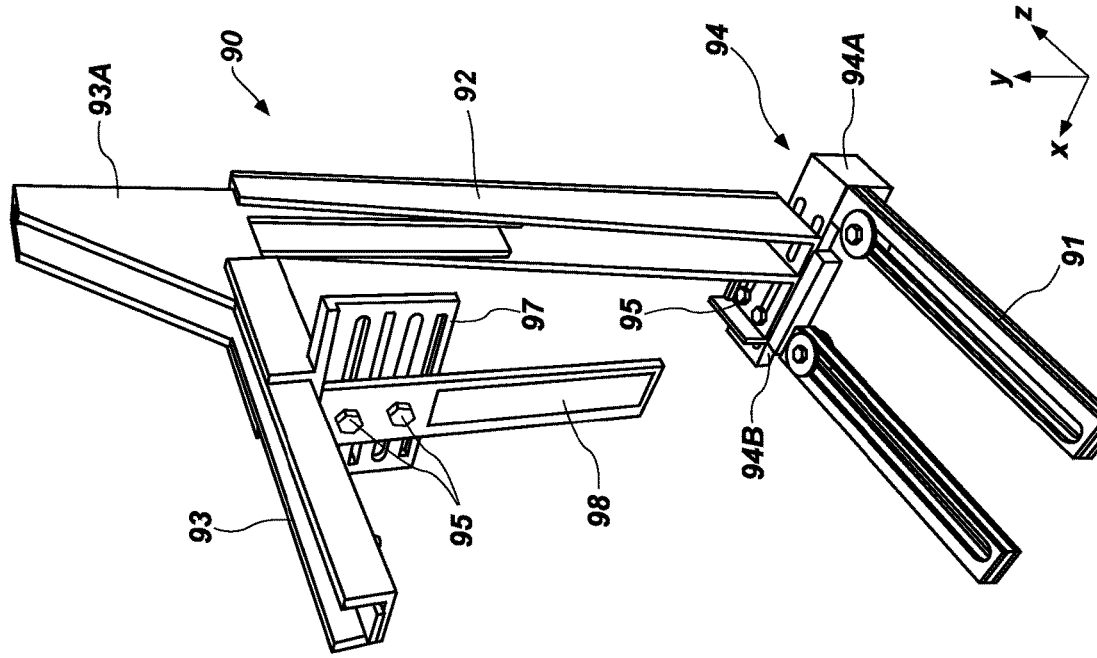
FIG. 9A shows a rising handle/rising stem attachment device, according to an embodiment of the disclosure.

FIG. 9A illustrates a rising handle/rising stem (referred to herein simply as a rising handle attachment device) attachment device 90, according to an embodiment of the disclosure. The rising handle attachment device 90 may include substantially straight adjustable feet 91 and a substantially straight first leg 92 and second substantially straight out-reach-element 93.

Figure 9C:
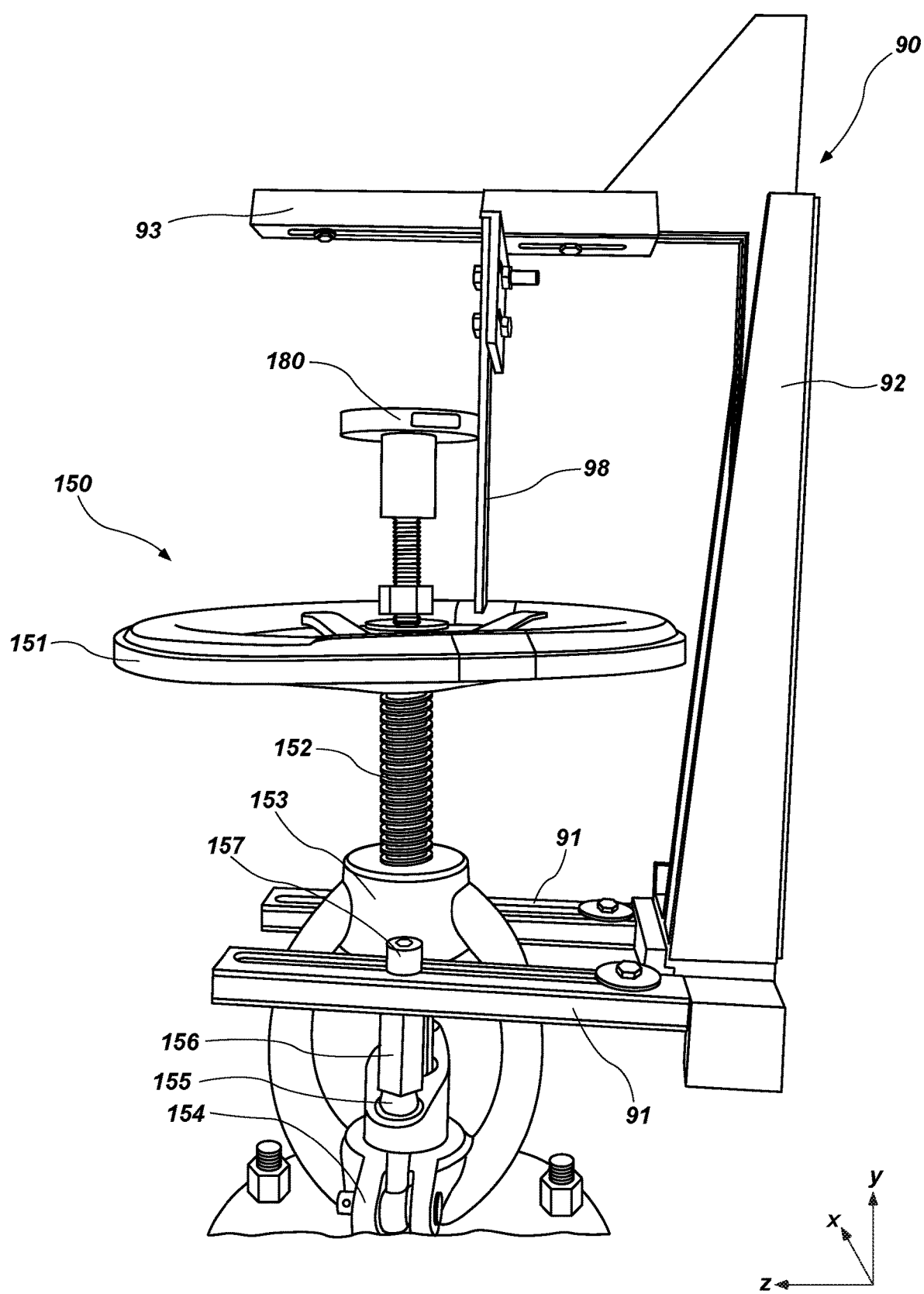
FIG. 9C shows a rising handle/rising stem attachment device installed at a rising handle valve, according to an embodiment of the disclosure.
Figure 9D:
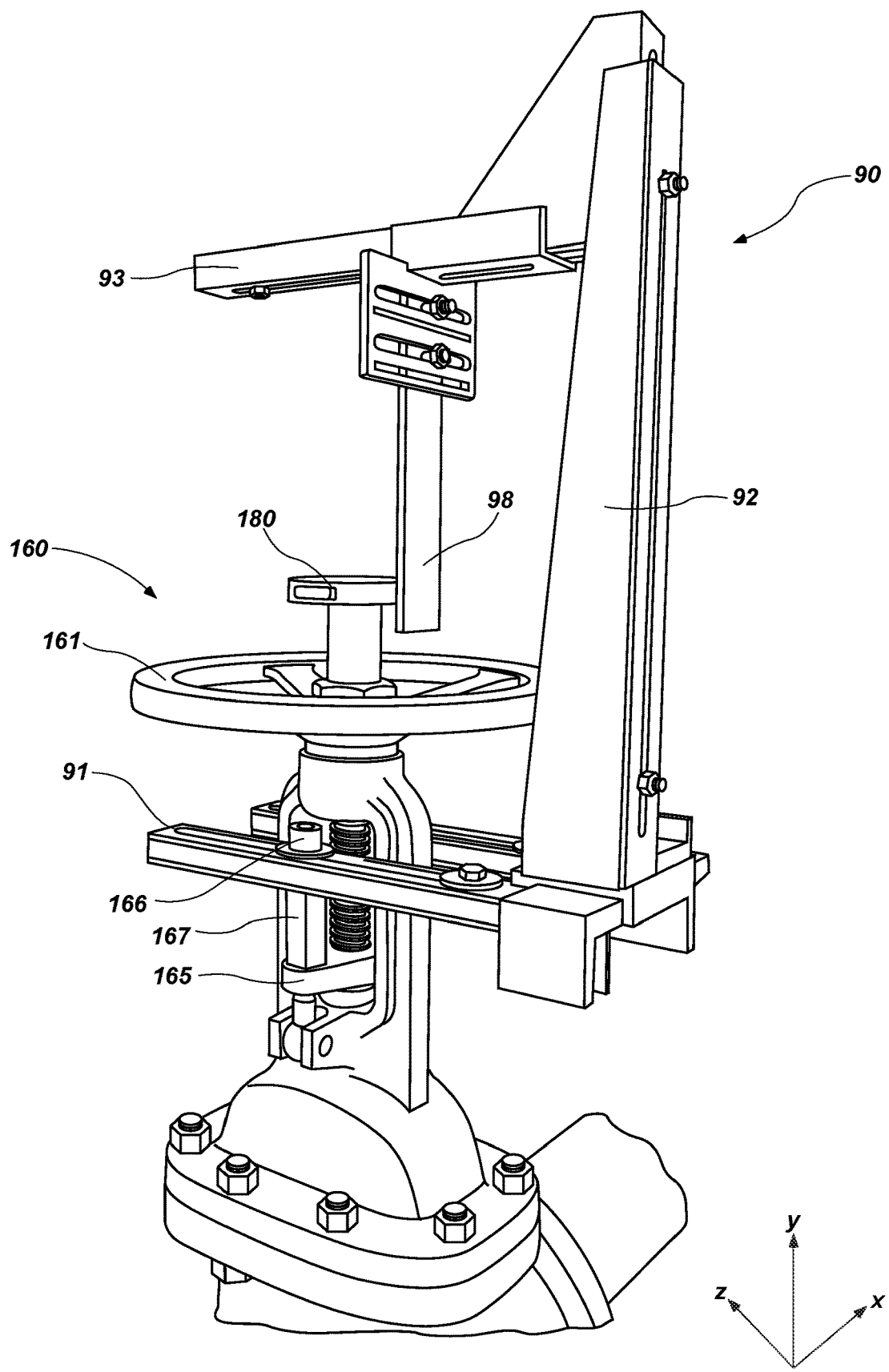
FIG. 9D shows a rising handle/rising stem attachment device installed at a rising stem valve, according to an embodiment of the disclosure.
Figure 9E:
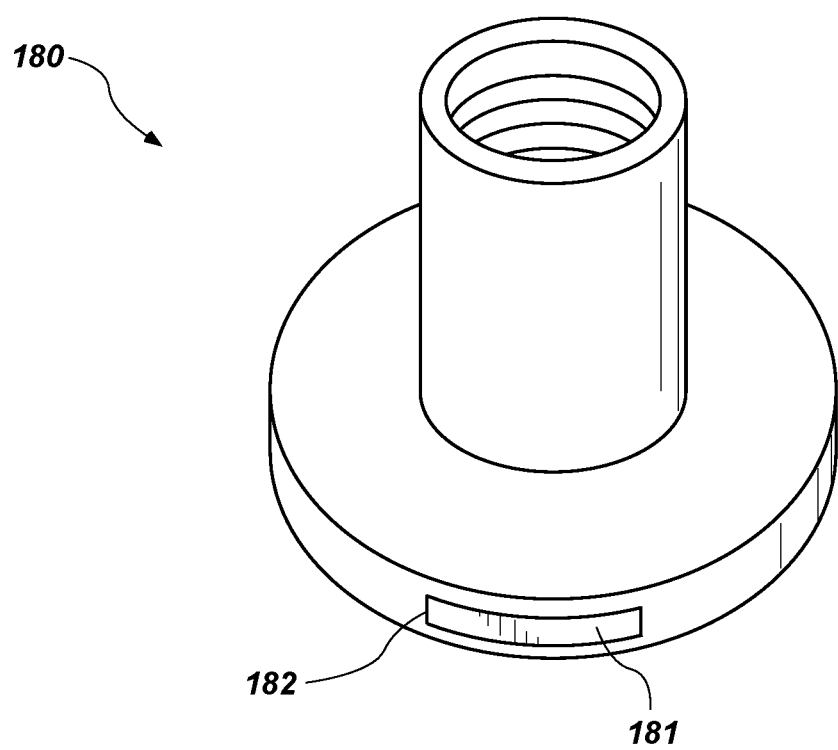
FIG. 9E shows a stem cap for a rising stem valve type, according to an embodiment of the disclosure.

FIG. 9E shows a rising stem valve type stem cap 180 that includes a magnetic element 181, in accordance with an embodiment of the disclosure. The magnetic element 181 is in a groove 182 formed in the top of the rising stem valve type stem cap 180. The rising stem valve type stem cap 180 is configured to attach to a valve stem and enables magnetic coupling to a magnetic valve position indication sensor used to provide measurement of valve position.

Figure 9F:
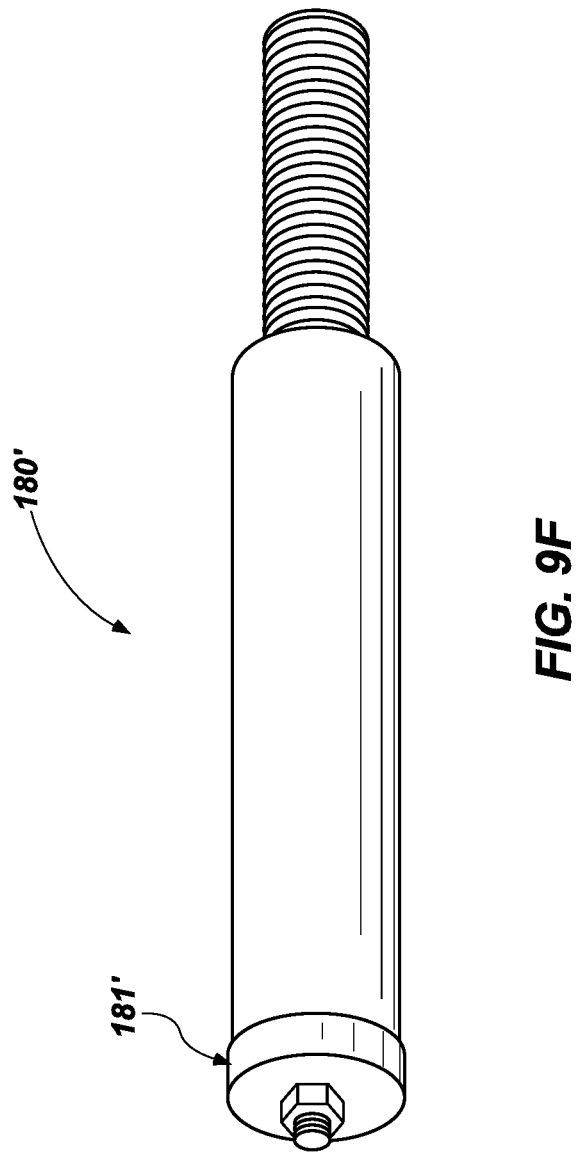
FIG. 9F shows a stem cap for a rising handle valve type, according to an embodiment of the disclosure.

FIG. 9F shows a rising handle valve type stem cap 180' that includes a magnetic element 181', in accordance with another embodiment of the disclosure. The magnetic element 181' fastens on the top of the rising handle valve type stem cap 180'. The rising handle valve type stem cap 180' is configured to attach to a valve stem and enables magnetic coupling to a magnetic valve position indication sensor used to provide measurement of valve position.

The adjustable feet 91 may be movable in the x-direction such that they may be close together or far apart. The first leg 92 and out-reach-element 93 may be slidably coupled to each other and adapted to slide relative to each other to raise or lower the height of the out-reach-element 93 in the y-direction. Here, the end of the out-reach-element 93 is a sliding portion 93*a* that is inserted into a sliding groove of the first leg 92, and may be held in position by one or more fasteners.

In one embodiment, the adjustable feet 91 may be coupled to a track element 94. The track element 94 may comprise a first track element 94*a* and a second track element 94*b*. The first track element 94*a* and second track element 94*b* may be attached to one end of one adjustable foot 91. The first track element 94*a* and second track element 94*b* may be slidably coupled to each other and adapted to slide relative to each other to lengthen or shorten the track element 94. In this way, the track element 94 may be adapted to facilitate lateral movement of the adjustable feet 91 along the track element 94 and substantially perpendicular to the longitudinal extent of adjustable feet 91. In one embodiment, each adjustable foot 91 may include fasteners 95 to fix the adjustable feet 91 at specific locations, for example, a screw, a bolt (screw and nut), a clip, or the like.

A track element 97 may be slidably coupled to the out-reach-element 93 by a sliding position element, such that the track element 97 may be positioned along the extent of the out-reach-element 93. A sensor out-reach element 98 may be slidably attached to the track element 97 and movable in the x-direction. The adjustable feet 91, out-reach-element 93 and sensor out-reach element 98 may include fasteners 95 to fix their respective positions. In various embodiments, the fasteners 95 may be a screw, a bolt (screw and nut), a clip, or the like.

FIG. 9B shows an optional rising handle attachment device 90', in accordance with an embodiment of the disclosure. As shown in FIG. 9B, in one embodiment, the adjustable leg 92' may comprise a first leg element 92*a'* and a second leg element 92*b'* that are slidably coupled to each other and adapted to slide relative to each other to lengthen or shorten the adjustable leg 92'. In one embodiment, the adjustable leg 92' may comprise one or more fasteners 95' to fix the first leg element 92*a'* and the second leg element 92*b'* in a certain position relative to each other (i.e., to fix the adjustable leg 92' at a certain height). In one embodiment, the adjustable leg 92' may be fixed at one end to the track element 94' such that when the adjustable feet 91' are resting on a flat surface the adjustable leg 92' extends upward from the track element 94'. The optional rising handle attachment device 90' may be used with rising handle type valves where an out-reach-element 93 is not required. The track element 94' may comprise a first track element 94*a'* and a second track element 94*b'*. The first track element 94*a'* and second track element 94*b'* may be attached to one end of each adjustable foot 91'. The first track element 94*a'* and second track element 94*b'* may be slidably coupled to each other and adapted to slide relative to each other to lengthen or shorten the track element 94'.

FIG. 9C shows a rising handle attachment device 90 attached to a rising handle valve 150, in accordance with an embodiment of the disclosure. The rising handle valve 150 is so called because the valve handle 151 moves up and down with the valve stem 152 as it is rotated—i.e., the valve handle 151 turns a valve stem 152 and a threaded portion of the valve stem turns in a threaded yoke 153 of the valve body 154, and that rotation translates into an up or down movement, including any flow control assembly (e.g., a valve disc) attached to an end of the valve stem 152 in the valve body 154.

The first leg 92 and out-reach-element 93 may be selected in the y-direction to approximately correspond to a traveling distance of a valve handle 151. The adjustable feet 91 may be movable in the x-direction such that they may be close together or far apart. In this manner, the rising handle attachment device 90 may be adjusted to fit different diameters of rising handle valves. Further, the point of attachment may also be varied (in and out, up and down) to fit different rising handle valves without interfering with, or obstructing, a field worker's manual valve manipulation. In other words, in some embodiments the rising handle attachment device 90 facilitates addition of a sensor system to a rising handle valve without modifying the mode of operation of such rising handle valve.

In various embodiments, a sensor element (not shown) configured for valve position measurement may be attached to the sensor out-reach element 98 by way of double sided tape and wired to a valve position measurement module 86 (not shown), the valve position measurement module 86 being part of a stack mounted on the first leg 92. The sensor may be configured for valve position measurement responsive to movement of the valve stem cap 180, which includes a magnetic element 181. The first leg 92 and out-reach-element 93 may also be adapted to move up and down to provide a place for a sensor element to be mounted to sense/measure the location of a valve handle.

In various embodiments, the rising handle attachment device 90 may attach to a rising handle valve 150 handle by way of connecting the adjustable feet 91 to existing nuts and bolts of a flange (not shown) on which a valve rests. In one embodiment, the rising handle attachment device 90 may include coupling nuts 156 with attachment bolts 157 that attach to a gland eyebolt 155. These attachment bolts 157 go through slots in adjustable feet 91 and tighten the rising handle attachment device 90 to the valve.

FIG. 9D shows a rising handle attachment device 90 attached to a rising stem valve 160, in accordance with an embodiment of the disclosure. The rising stem valve 160 is so called because the valve stem (not shown) rises as the valve handle 161 rotates. The rising handle attachment device 90 is attached to the rising stem valve 160 by coupling nuts 167 with attachment bolts 166 that attach to a gland eyebolt 165. These attachment bolts go through slots in adjustable feet 91 to tighten the rising handle attachment device 90 to the valve in a similar way it was attached to the rising handle valve 150.

The length of the out-reach-element 93 and the position of the sensor out-reach element 98 may be selected to vary a point of attachment of the rising handle attachment device 90 and install a sensor on the sensor out-reach element 98 in proximity to the valve stem cap 180 without interfering with, or obstructing, a worker's manipulation of a rising stem valve 160. In this manner, the rising handle attachment device 90 facilitates the addition of a sensor without modifying the mode of operation of a rising stem valve 160.

Figure 10A:
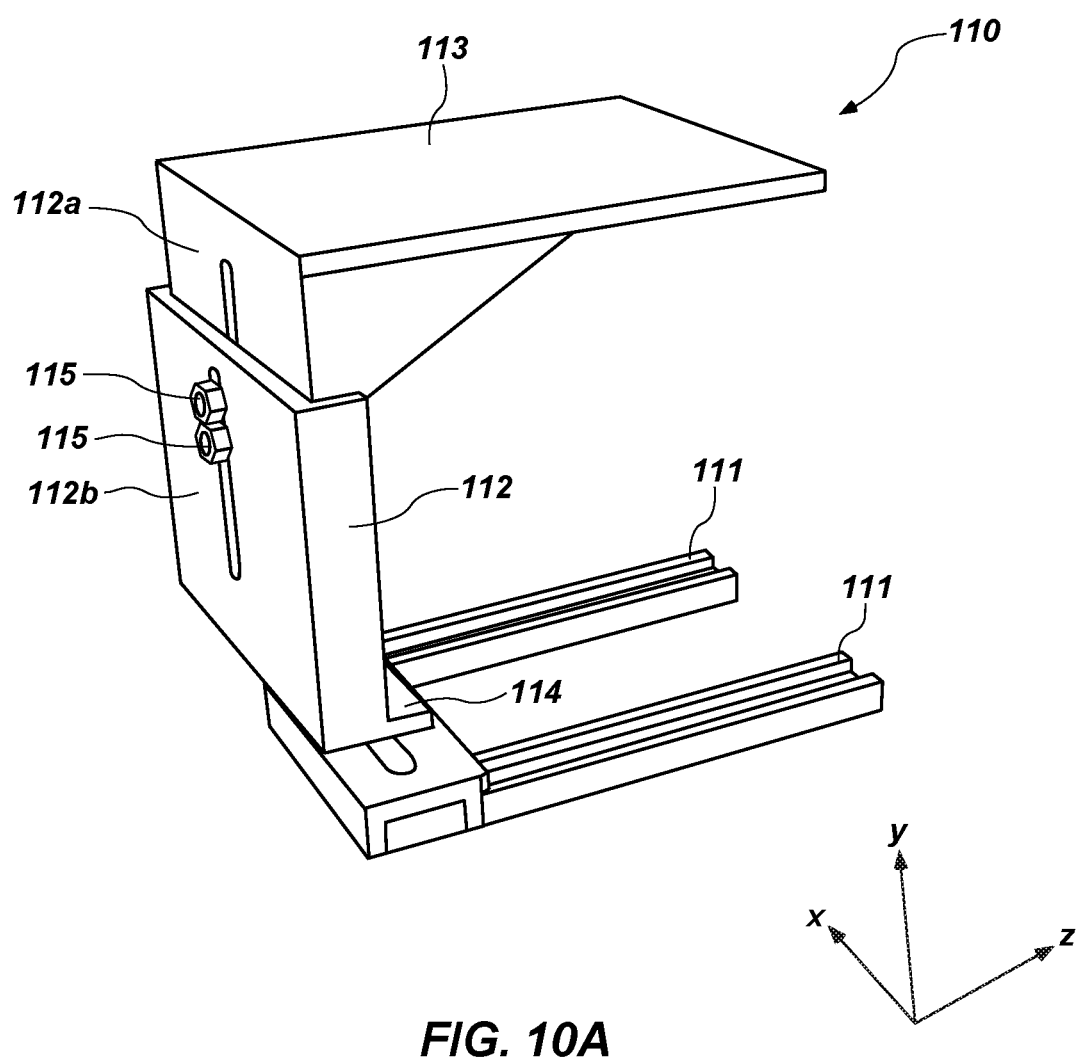
FIG. 10A shows a quarter-turn attachment device, according to an embodiment of the disclosure.

FIG. 10A shows a quarter-turn attachment device 110, according to an embodiment of the disclosure. The quarter-turn attachment device 110 may include substantially straight adjustable feet 111, a substantially straight adjustable leg 112 and a substantially straight arm 113. In one embodiment, the arm 113 has a width selected to accommodate a variety of circular sensors to cover an operating angle of a variety of quarter-turn valves. The adjustable feet 111 may be slidably coupled to a track element 114, and while coupled to the track element 114 may extend outward from the track element 114. The adjustable feet 111 may be adapted to move laterally along the track, closer together or farther apart. In one embodiment, each foot may include fasteners 115 to fix the adjustable feet 111 at a specific location along the track element 114, for example, a screw, a bolt (screw and nut), a clip, or the like.

The adjustable leg 112 may comprise a first leg element 112a and a second leg element 112b that are slidably coupled to each and adapted to slide relative to each other to lengthen or shorten the adjustable leg 112. In one embodiment, the adjustable leg 112 has a width selected to accommodate a wireless sensor system 3 (see FIGS. 7A and 7B). In one embodiment, the adjustable leg 112 may comprise one or more fasteners 115 to fix the first leg element 112a and the second leg element 112b in a certain position relative to each other (i.e., to fix the adjustable leg 112 at a certain height). In one embodiment, the adjustable leg 112 may be fixed at one end to the track element 114 such that when the adjustable feet 111 are resting on a horizontal surface the adjustable leg 112 extends upward from the track element 114.

One end of the extent of the arm 113 may be attached to the adjustable first leg element 112a, for example, mechanically, by a bracket, or by a screw, and extend substantially perpendicular from the adjustable leg 112.

Figure 10B:
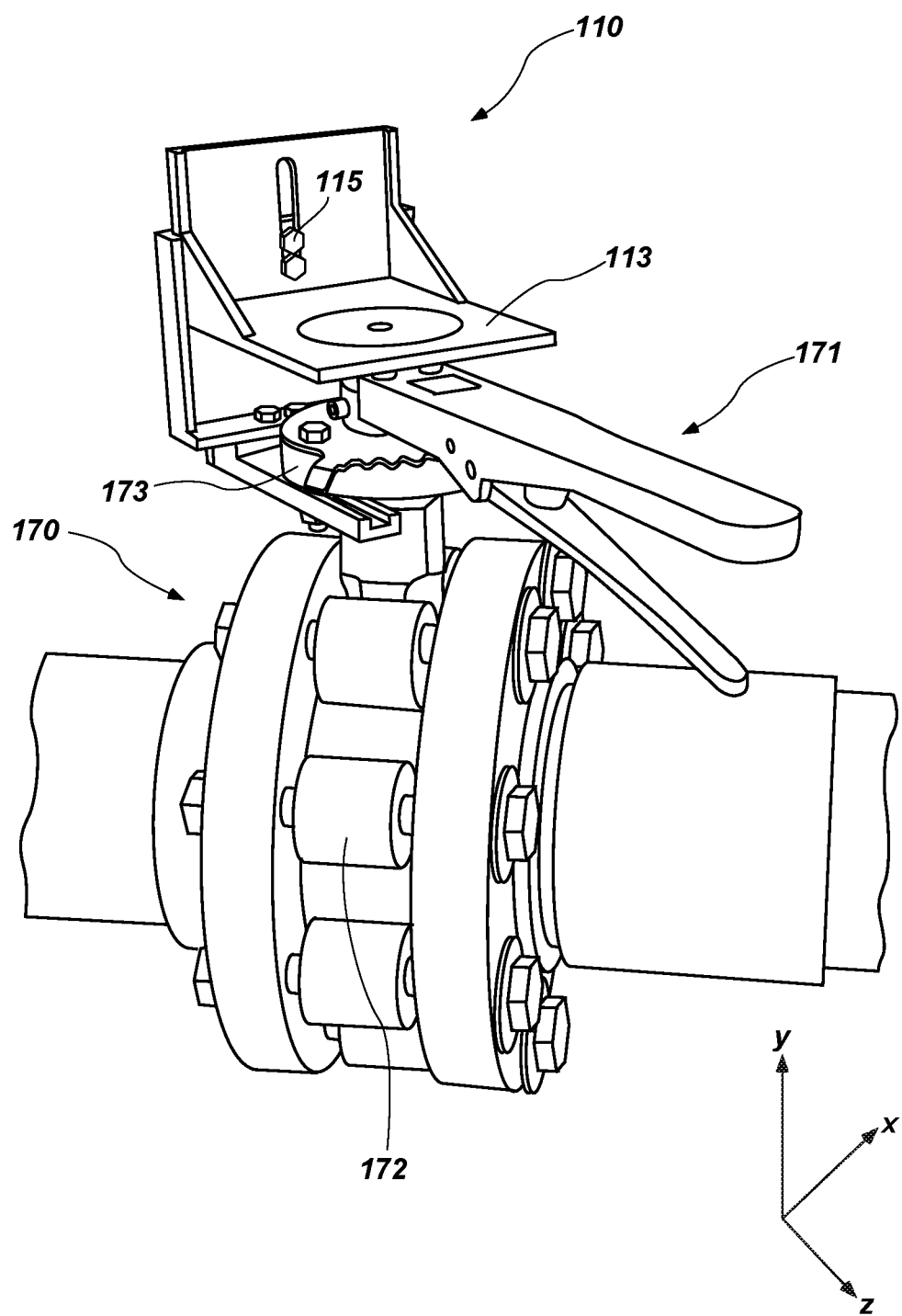
FIG. 10B shows a quarter-turn attachment device installed at a quarter-turn valve, according to an embodiment of the disclosure.

FIG. 10B shows a quarter-turn attachment device 110 attached to a quarter-turn valve 170, in accordance with an embodiment of the disclosure. The quarter-turn valve 170 is so called because turning valve handle 171 causes rotation of a valve stem (not shown) and a hollowed out ball (not shown)—a 90° change in direction of the ball blocks flow through the valve body 172.

A circular sensor (not shown) may be attached to the underside (facing the valve) of arm 113, so that as valve handle 171 is rotated a magnet element attached to valve handle 171 moves in an arc that matches the arc of the circular sensor thereby enabling the sensor to sense/measure the position of the valve handle 171.

Notably, the arm 113 shown in FIG. 10B is arranged 180° taken about an axis that passes substantially parallel to the extent of the fastener 115, compared to the arrangement in FIG. 10A.

In various embodiments, the quarter-turn attachment device 110 may attach to the quarter-turn valve 170 by way of connecting the adjustable feet 111 to existing nuts and bolts on a flange 173.

The various embodiments described herein, as a result of their adaptability to various makes and models of valves and associated components may eliminate reliance by any customer on a single manufacturer of wireless sensors that may reduce the cost of wireless sensors, make them more reliable, easier to maintain, expand the applications where they can be installed and easier to take advantage of new sensor, power and communication technologies as they are developed.

Various embodiments of the wireless sensor system 3, generally, and the valve position sensor system 82 may be retrofitted on existing plant manual valves without impacting valve qualification. This is significant in mission critical industries, and makes the system economical. Conventional valve position sensor systems require either partial or complete modification of a manual valve to enable implementation of valve position measurement, and rely on proprietary solutions.

Figure 11:
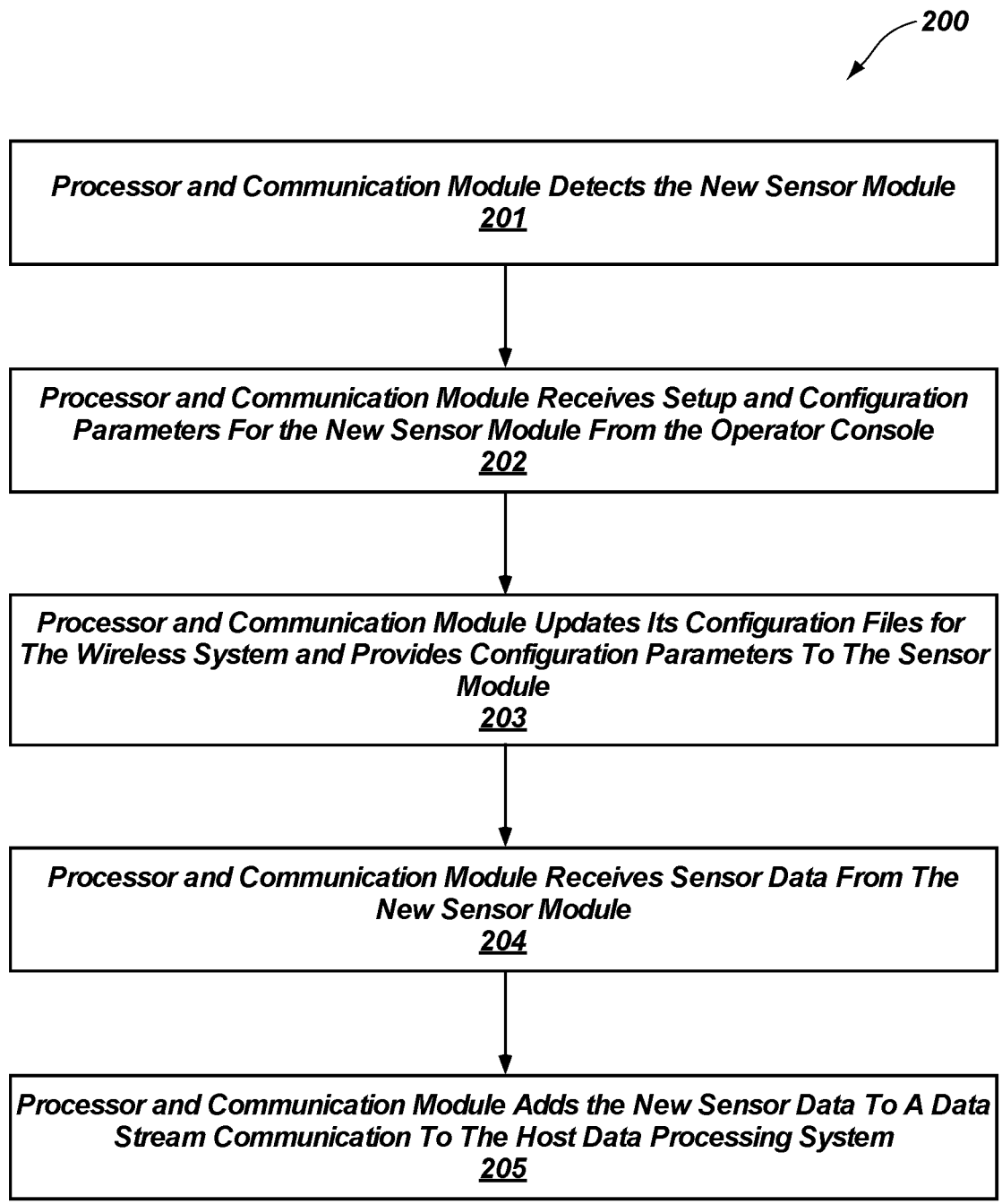
FIG. 11 shows a flowchart for a setup process, according to an embodiment of the disclosure.

FIG. 11 shows a flowchart for a process 200 for adding a new module to a wireless measurement system 80, in accordance with an embodiment of the disclosure. The processor and communication module 85 detects the addition of a new sensor module to the wireless measurement system 80, in operation 201. In one embodiment, the new sensor module may announce its presence to the processor and communication module 85 across a common interface. An administrator at the operator console 89 may initiate a setup and configuration process and send setup and configuration parameters to the processor and communication module 85, in operation 202. The processor and communication module 85 updates its configuration file based on the received setup and configuration parameters and provides configuration parameters to the sensor module to operate within the wireless measurement system 80, in operation 203. After the setup and configuration process completes, the new sensor module provides sensor data to the processor and communication module 85, in operation 204. The new sensor module may also provide sensor data to the data storage module 84. The processor and communication module 85 adds the new sensor data to a data stream communicated to the host data processing system 88, in operation 205. In another embodiment, the processor and communication module 85 may be pre-programmed to automatically detect, setup, and configure a variety of types of sensor modules added to a wireless measurement system 80, without an administrator's help.

While the various embodiments described above were generally related to sensors and measurement, it is specifically contemplated that control system modules may be included and implemented as described, above.

Certain non-limiting benefits and advantages have been described to assist one of ordinary skill in the art to understand the various embodiments described herein. One of ordinary skill in the art will understand that the various embodiments of the present disclosure offer other benefits and advantages over conventional wireless sensor systems then just those that were described herein.

The features of the various embodiments described herein are not mutually exclusive and can exist in various combinations and permutations, even if such combinations or permutations are not expressly described herein, without departing from the scope of the disclosure. In fact, variations, modifications, and other implementations of what is described herein will occur to one of ordinary skill in the art without departing from the scope of the disclosure. As such, the invention is not to be defined only by the preceding illustrative description, but only by the appended claims, and legal equivalents thereof.

We claim:

1. A sensor system, comprising:
   unitary modules each coupled to an interconnect, the interconnect comprising unwired connectors configured to facilitate transfer of data and power among at least some of the unitary modules, at least three of the unitary modules adapted to perform different functions from each other, the unitary modules sharing a common form factor to enable interfacing of any of the unitary modules with any of the unwired connectors of the interconnect, the unitary modules including:
       a sensor module adapted to capture measurement data;
       a storage module adapted to store the captured measurement data; and
       a processor and communication module adapted to communicate the captured measurement data.

2. The sensor system of claim 1, wherein the unitary modules further comprise a power module adapted to supply power to the processor and communication module, the storage module, and the sensor module.

3. The sensor system of claim 1, wherein the unitary modules comprise uniform enclosures.

4. The sensor system of claim 3, wherein the uniform enclosures each have about the same dimension and shape.

5. The system of claim 1, wherein each of the modules are removably coupled to the interconnect.

6. The system of claim 1, wherein the unwired connectors comprise power connectors.

7. The system of claim 6, wherein the power connectors comprise a power output connector and a power input connector.

8. The system of claim 7, wherein the power output connectors comprise power sockets and the power input connectors comprise power inserts, wherein the power output connectors and power input connectors are formed to couple in an interlocking manner.

9. The system of claim 7, wherein, while coupled, the power output connector and power input connector are configured to enable power transmission across at least two contacting surfaces.

10. The system of claim 1, wherein the unwired connectors comprise data connectors.

11. The system of claim 10, wherein the unwired data connectors comprise:
    male data connectors; and
    female data connectors.

12. The system of claim 11, wherein the male data connectors comprise a first group of data tabs and the female data connectors comprise a second group of data tabs.

13. The system of claim 12, wherein the male data connectors and the female data connectors are shaped to couple in an interlocking manner.

14. The system of claim 12, wherein, while coupled, the male data connector and female data connector are configured to enable data packet communication across a group of contacting data tabs.

15. A sensor system, comprising:
    unitary modules each coupled to an interconnect, the interconnect comprising unwired connectors configured to facilitate transfer of data and power among at least some of the unitary modules,
    wherein the unitary modules are adapted to capture, store and communicate measurement data relating to a process or equipment state,
    wherein a first unitary module comprises:
        a first connector of the connectors and a second connector of the connectors, and a second unitary module comprises a third connector of the connectors and a fourth connector of the connectors, and
    wherein the first connector is disposed on a top surface of the first unitary module and the second connector is disposed on a bottom surface of the first unitary module, and the third connector is disposed on a top surface of the second unitary module and the fourth connector is disposed on a bottom surface of the second unitary module.

16. The system of claim 15, wherein the first connector is configured to be complementary to the third connector, and the second connector is configured to be complementary to the fourth connector.

17. A measurement system, comprising:
    unitary modules comprising a valve position measurement module adapted to capture measurement data indicating a position of a valve, a storage module adapted to store the captured measurement data, and a processing and communication module adapted to communicate the captured measurement data, the measurement data relating to a process or equipment state; and an interconnect, each of the unitary modules coupled to the interconnect, the interconnect comprising unwired connectors configured to facilitate transfer of data and power among at least some of the unitary modules, the unwired connecters further configured to facilitate transfer of the data and the power to the valve position measurement module and the processing and communication module, the unitary modules sharing a common form factor to enable interfacing of any of the unitary modules with any of the unwired connectors of the interconnect.

18. The measurement system of claim 17, further comprising a frame adapted to hold the valve position measurement module and position the valve position measurement module in operable proximity relative to a valve.

19. The measurement system of claim 18, wherein the frame comprises means to position the frame relative to a handle of a rising handle valve.

20. The measurement system of claim 18, wherein the frame comprises means to position the frame relative to the stem of a rising stem valve.

21. The measurement system of claim 18, wherein the frame comprises means to position the frame relative to a handle of a quarter-turn valve.

22. The measurement system of claim 18, wherein the frame comprises spatially adjustable legs, feet and arms.

\* \* \* \* \*